(12) United States Patent
Kamakura

(10) Patent No.: US 12,405,477 B2
(45) Date of Patent: Sep. 2, 2025

(54) IMAGE DISPLAY DEVICE

(71) Applicant: SEIKO EPSON CORPORATION, Tokyo (JP)

(72) Inventor: Kazuya Kamakura, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 8 days.

(21) Appl. No.: 18/450,393

(22) Filed: Aug. 15, 2023

(65) Prior Publication Data
US 2024/0061259 A1    Feb. 22, 2024

(30) Foreign Application Priority Data

Aug. 17, 2022   (JP) .................................. 2022-130279

(51) Int. Cl.
*G02B 27/01* (2006.01)

(52) U.S. Cl.
CPC .. *G02B 27/0176* (2013.01); *G02B 2027/0154* (2013.01); *G02B 2027/0178* (2013.01); *G02B 2027/0194* (2013.01)

(58) Field of Classification Search
CPC ............... G02B 27/01; G02B 27/0172; G02B 27/0176; G02B 2027/0178; G02B 2027/0154; G02B 2027/0194
See application file for complete search history.

(56) References Cited

U.S. PATENT DOCUMENTS

| 2017/0235129 A1* | 8/2017 | Kamakura | G02B 27/0006 345/8 |
|---|---|---|---|
| 2020/0310140 A1* | 10/2020 | Kamakura | G02B 6/0085 |
| 2021/0173213 A1* | 6/2021 | Ricks | G02B 7/1805 |
| 2022/0163809 A1* | 5/2022 | Lee | G02B 27/0176 |
| 2023/0251487 A1* | 8/2023 | Hwang | G02B 5/32 359/630 |

FOREIGN PATENT DOCUMENTS

JP          2017147523          8/2017

* cited by examiner

*Primary Examiner* — Nitin Patel
*Assistant Examiner* — Amen W Bogale
(74) *Attorney, Agent, or Firm* — JCIPRNET

(57) ABSTRACT

An image display device includes a display element, an optical member for imaging, a circuit board, an optical case configured to accommodate the display element and the optical member, a metallic frame configured to support the circuit board from below, and an exterior case configured to accommodate the optical case and the metallic frame, wherein the metallic frame is disposed above the optical case, and the exterior case includes an upper case and a lower case, and includes a first seal member at a first facing portion between the upper case and the lower case.

10 Claims, 21 Drawing Sheets

IMAGE DISPLAY DEVICE

The present application is based on, and claims priority from JP Application Serial Number 2022-130279, filed Aug. 17, 2022, the disclosure of which is hereby incorporated by reference herein in its entirety.

BACKGROUND

1. Technical Field

The present disclosure relates to an image display device that enables observation of a virtual image.

2. Related Art

JP-A-2017-147523 discloses an image display device in which an image projection unit and a control unit are accommodated in a case member mounted in a frame member, and the control unit is disposed below the image projection unit. In this device, the control unit is surrounded by a first rib of an inner case located between the image projection unit and the control unit, and is further covered by an exterior case. In this device, the image projection unit and the control unit are waterproofed by the exterior case, and the control unit is waterproofed by the inner case.

In the device of the background art described above, waterproofing is achieved by fitting the inner case and the exterior case together, but, when fastening of the exterior case or the like is loosened, there is a possibility that a waterproof function will deteriorate in a fitting portion.

SUMMARY

According to an aspect of the present disclosure, there is provided an image display device including a display element, an optical member for imaging, a circuit board, an optical case configured to accommodate the display element and the optical member, a metallic frame configured to support the circuit board from below, and an exterior case configured to accommodate the optical case and the metallic frame, wherein the metallic frame is disposed above the optical case, and the exterior case includes an upper case and a lower case, and includes a first seal member at a first facing portion between the upper case and the lower case.

BRIEF DESCRIPTION OF THE DRAWINGS

FIG. 10 is a perspective view for describing a modified example of a support structure and the like.

FIG. 14 is a side cross-sectional view of a barrel, an optical member held by the barrel, and the like.

DESCRIPTION OF EXEMPLARY EMBODIMENTS

An embodiment of an image display device according to the present disclosure will be described below with reference to FIGS. 1, 2 and the like.

Figure 1:
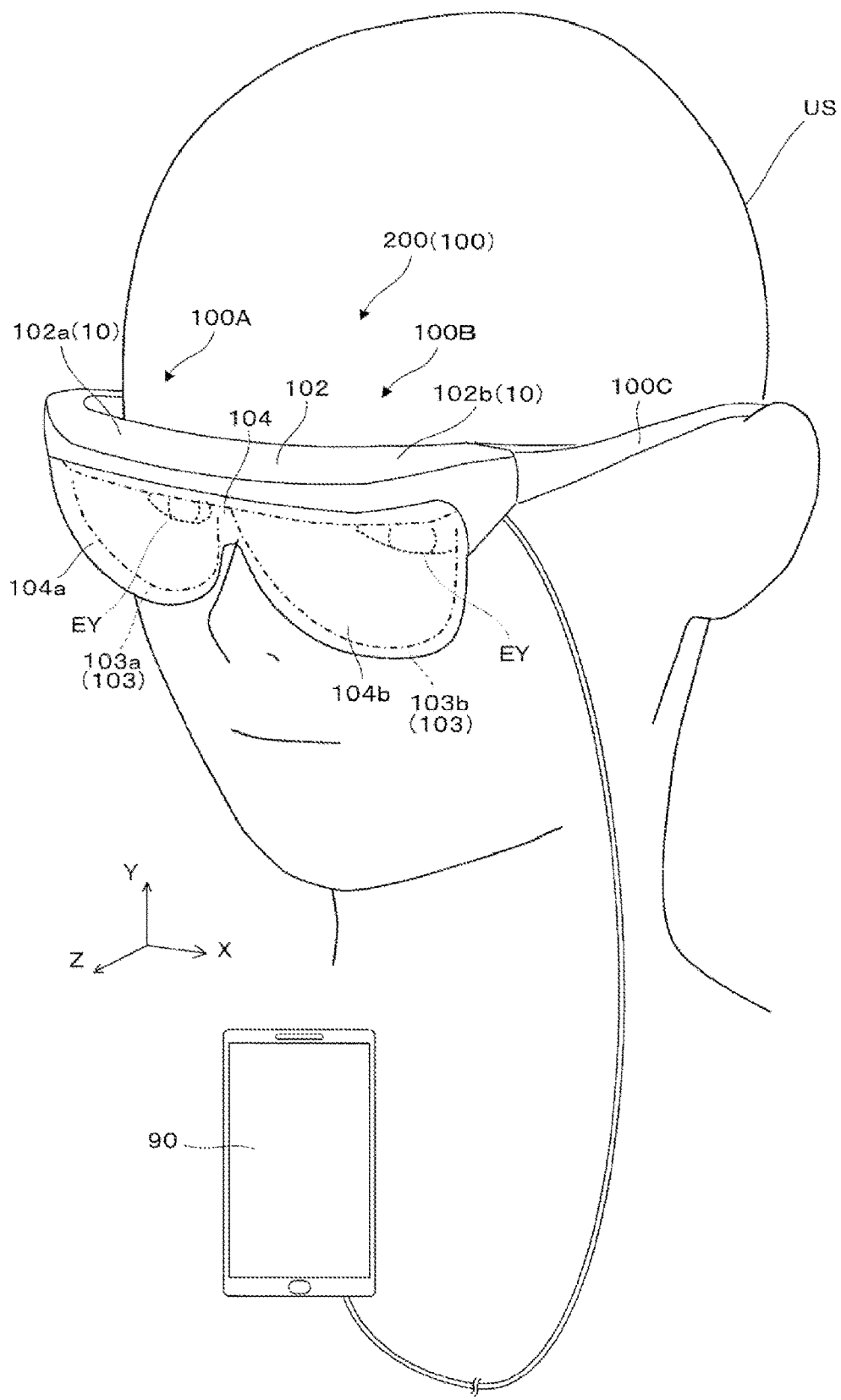
FIG. 1 is an external perspective view for describing a mounting state of an image display device according to an embodiment.
Figure 2:
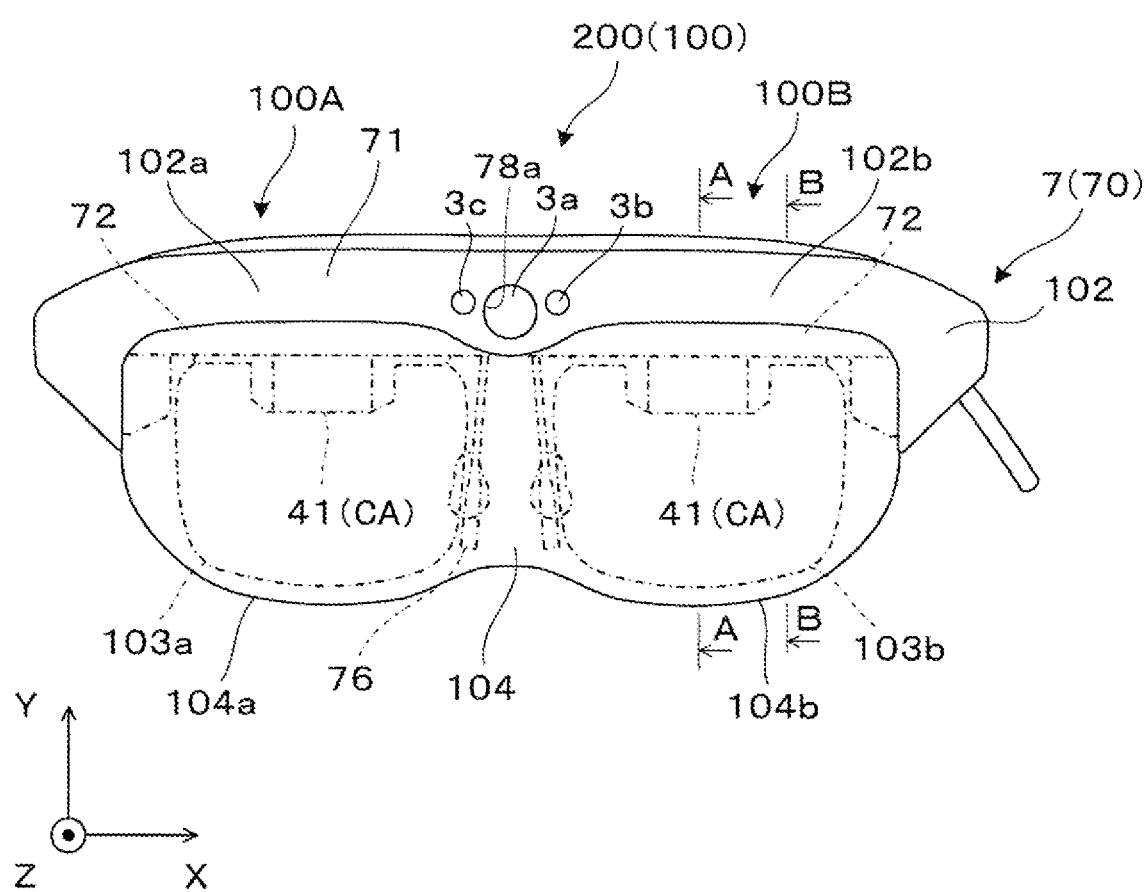
FIG. 2 is a front view of the image display device.
Figure 3:
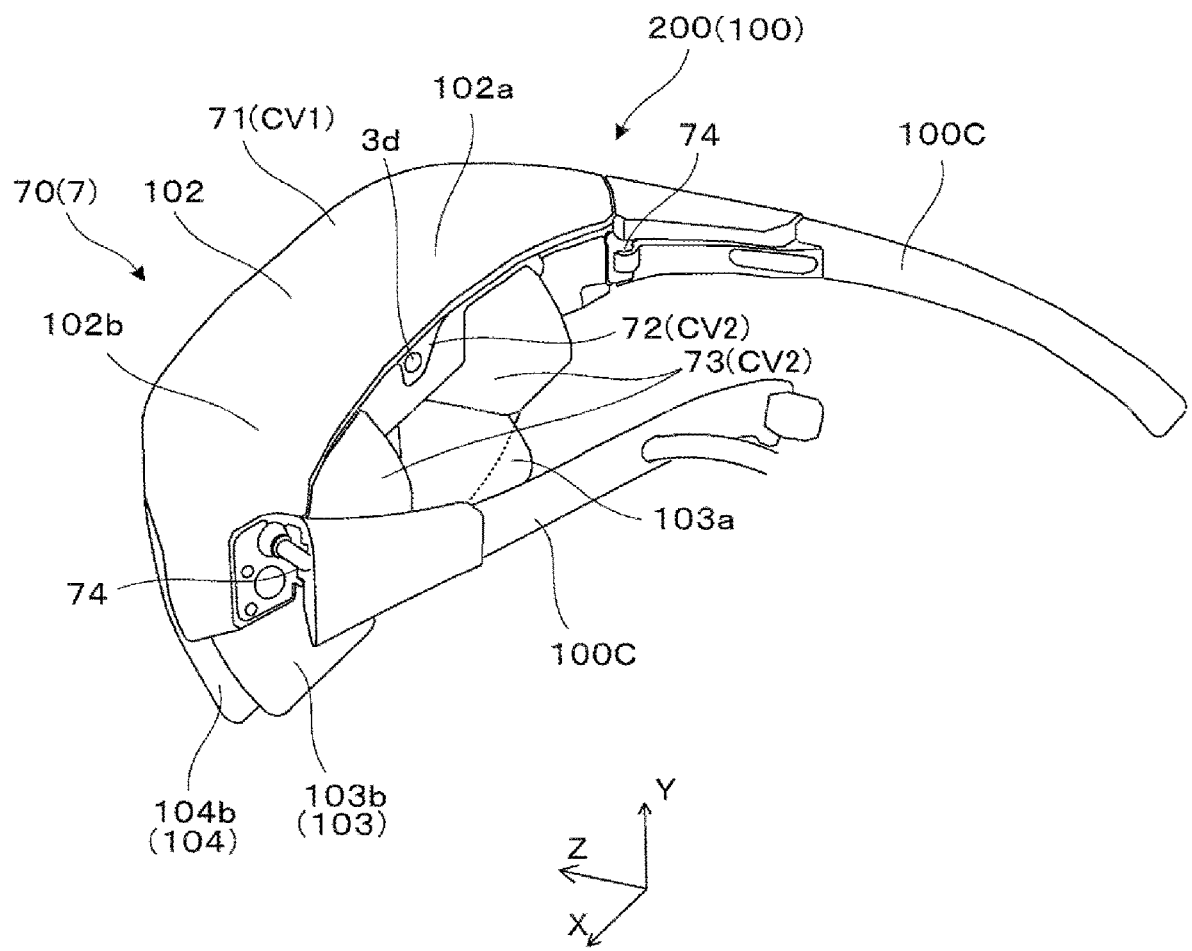
FIG. 3 is a perspective view of the image display device from diagonally behind.

FIG. 1 is a perspective view illustrating a wearing state of a head-mounted display (hereinafter, also referred to as an HMD) 200, FIG. 2 is a front view of a main body of the HMD 200, and FIG. 3 is a perspective view of the main body of the HMD 200 seen from the rear and above. The HMD 200 allows an observer or a wearer US who wears the HMD 200 to recognize a video as a virtual image. In FIGS. 1, 2 and the like, X, Y, and Z are of an orthogonal coordinate system, a +X direction corresponds to a horizontal direction in which both eyes EY of the observer or wearer US wearing the HMD 200 or an image display device 100 are arranged, a +Y direction corresponds to an upward direction orthogonal to the horizontal direction in which both eyes EY of the wearer US are arranged, and a +Z direction corresponds to a forward or frontal direction with respect to the wearer US. The ±Y directions are parallel to a vertical axis or a vertical direction.

The HMD 200 includes a first display device 100A for the right eye, a second display device 100B for the left eye, a pair of temple type support devices 100C that support the display devices 100A and 100B, and a user terminal 90 as an information terminal. The first display device 100A functions independently as an image display device, and is constituted of a first display driving unit 102a disposed at an upper portion thereof, a first combiner 103a that is shaped like a spectacle lens and covers the front of the eye, and a light transmission cover 104a that covers the combiner 103a from the front. Similarly, the second display device 100B functions independently as an image display device, and is constituted of a second display driving unit 102b disposed at an upper portion thereof, a second combiner 103b that is shaped like a spectacle lens and covers the front of the eye, and a light transmission cover 104b that covers the combiner 103b from the front. The support device 100C is a mounting member that is mounted on the head of the wearer US, and supports the upper end sides of the pair of combiners 103a and 103b and the upper end sides of the pair of light transmission covers 104a and 104b via the display driving units 102a and 102b integrated in appearance. In this specification, one of the first combiner 103a and the second combiner 103b may be referred to as the combiner 103. A combination of the pair of display driving units 102a and 102b is referred to as a driving device 102. A combination of the pair of light transmission covers 104a and 104b is referred to as a shade 104.

The first display device 100A and the second display device 100B are optically identical or mirror-reversed, and a detailed description of the second display device 100B will be omitted.

Referring to FIGS. 2 and 3, the driving device 102 includes a front cover 71, a middle frame 72, and a lower cover 73 as an exterior case 7 or a cover member 70 constituting an exterior. The front cover 71 is an upper case CV1 that covers a front portion and an upper portion of the driving device 102. The front cover 71 and the shade 104 are joined and integrated. The middle frame 72 is one of members constituting the lower case CV2 that supports optical members and the like incorporated in the driving device 102 at both ends and covers the incorporated components mainly from the front side. The lower cover 73 is one of members constituting the lower case CV2 that covers the optical members incorporated in the driving device 102 mainly from the rear and below. Hinges 74 are mounted on both ends of the middle frame 72, and support the pair of support devices 100C in a foldable manner.

Figure 4:
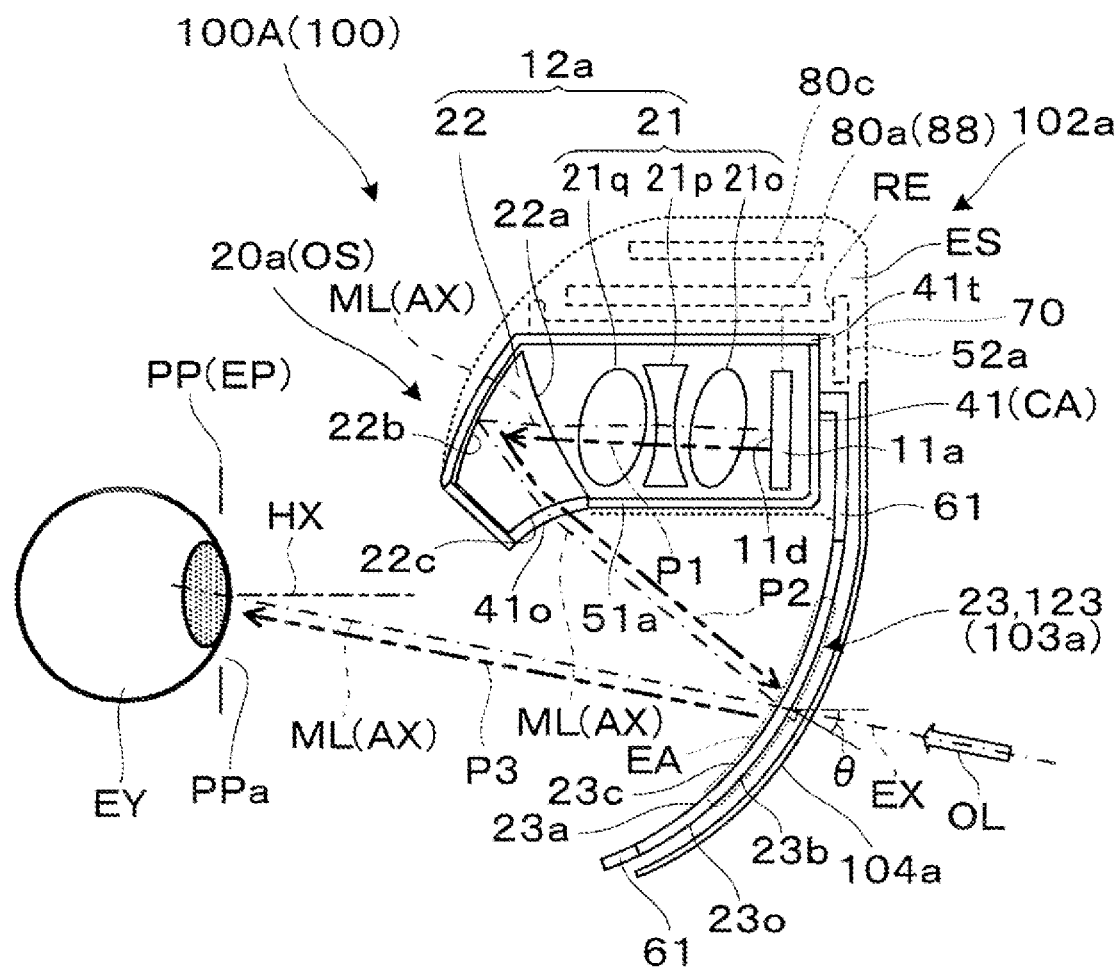
FIG. 4 is a side cross-sectional view for describing an optical internal structure of the display device on one side.

FIG. 4 is a side cross-sectional view illustrating an optical structure of the first display device 100A. The first display device 100A includes a first display element 11a, a first display unit 20a, and a first circuit member 80a. The first display element 11a is an image light generating device. The first display unit 20a is an imaging optical system that forms a virtual image, and includes a projection lens 21, a prism mirror 22, and a see-through mirror 23 in an integrated state. In the first display unit 20a, the projection lens 21 and the prism mirror 22 function as a first projection optical system 12a on which image light ML from the first display element 11a is incident, and the see-through mirror 23 functions as a partially transmissive mirror 123 that partially reflects the image light ML emitted from the first projection optical system 12a toward a pupil position PP or an eye EY. The projection lens 21 and the prism mirror 22 constituting the first projection optical system 12a correspond to a first optical member and a second optical member on which the video light or the image light ML is incident, respectively. Further, the first display element 11a, the projection lens 21, and the prism mirror 22 are optical elements that constitute the first display driving unit 102a illustrated in FIG. 1, and the see-through mirror 23 corresponds to the first combiner 103a illustrated in FIG. 1. The see-through mirror 23 has an exterior that is convex outward. The projection lens 21 and the prism mirror 22 constituting the first projection optical system 12a are fixed in the barrel 41 in a mutually aligned state together with the first display element 11a. The barrel 41 is an optical case CA in which the first projection optical system 12a is accommodated in a positioned state.

The barrel 41 or the optical case CA that accommodates the optical elements constituting the projection lens 21 and the like is supported by a first metallic frame 52a and is disposed below the first metallic frame 52a. The first metallic frame 52a is covered by the cover member 70, and the barrel 41 is also entirely covered by the cover member 70. The first metallic frame 52a is formed of a metallic material. The barrel 41 and the cover member 70 are formed of a light-shielding resin material, and one surface of the prism mirror 22 is exposed at an emission port 41o of the barrel 41. The barrel 41 is in contact with the first metallic frame 52a so that an upper portion 41t is fitted thereto, and is fixed in a state in which it is suspended from the first metallic frame 52a. As a result, the first display unit 20a is fixed in a state in which it is suspended from the first metallic frame 52a by the upper portion 41t of the barrel 41 being brought into contact with and screwed to the first metallic frame 52a so as to be fitted thereto. The first metallic frame 52a has a recess RE for arranging the first circuit member 80a on an upper side thereof. The cover member 70 has an internal space ES of which a sealing property is enhanced by being combined with the barrel 41 or the like, and an accessory component circuit member 80c is accommodated above the first circuit member 80a in the internal space ES.

In the first display device 100A, the first display element 11a is a spontaneous light emission type image light generation device. The first display element 11a emits the image light ML to the first projection optical system 12a. The barrel 41 accommodates and supports the first display element 11a together with optical elements such as the projection lens 21. The first display element 11a is, for example, an organic electroluminescence (EL) display, and forms a color still image or moving image on a two-dimensional display surface 11d. The first display element 11a is driven by the first circuit member 80a, specifically a display control device 88, to perform a display operation. The first display element 11a is not limited to the organic EL display, and can be replaced with a display device using inorganic EL, an organic LED, an LED array, a laser array, a quantum dot light emission element, or the like. The first display element 11a is not limited to the spontaneous light emission type image light generation device, and may include an LCD and another light modulation element, and may form an image by illuminating the light modulation element with a light source such as a backlight. As the first display element 11a, a liquid crystal on silicon (LCOS) (LCoS is a registered trademark), a digital micro-mirror device, or the like may be used instead of an LCD.

In the present embodiment, the first display unit 20a includes two reflection surfaces, and an optical path is bent by the see-through mirror 23 and the prism mirror 22. The first display unit 20a is an off-axis optical system OS. The projection lens 21, the prism mirror 22, and the see-through mirror 23 are disposed to be non-axially symmetrical and have an optical surface that is non-axisymmetric. In the first display unit 20a, the optical elements 21, 22, and 23 are arranged along an off-axis plane by bending an optical axis AX within an off-axis plane (that is, a reference plane) parallel to an YZ plane. In other words, in the off-axis plane (the reference plane) parallel to the YZ plane, an optical path portion P1 from the projection lens 21 to an inner reflection surface 22b, an optical path portion P2 from the inner reflection surface 22b to the see-through mirror 23, and an optical path portion P3 from the see-through mirror 23 to the pupil position PP are bent in a Z shape in two stages. As a result, a normal line at a central portion in which the optical axis AX in the see-through mirror 23 intersects forms an angle of about θ=40 to 50° with respect to the Z direction. In the first display unit 20a, the optical elements 21, 22, and 23 constituting the first display device 100A are arranged so that height positions thereof change in a longitudinal direction, and an increase in a transverse width of the first display device 100A can be prevented. Further, since the optical path portions P1 to P3 are disposed to be folded in two stages in a Z shape by folding of the optical path due to reflection by the prism mirror 22 or the like, and since the optical path portions P1 and P3 are relatively close to horizontal, it is possible to reduce a size of the first display unit 20a also in the vertical direction and the forward and rearward direction. In addition, since an inclination angle θ of the central portion of the see-through mirror 23 is 40° to 50°, when an inclination of the optical path portion P3 corresponding to the line of sight is constant, the inclination of the optical path portion P2 with respect to the Z-axis is 70° to 90°, and a thickness of the image display device 100 in the Z direction can be easily reduced.

In the first display unit 20a, the optical path portion P1 from the projection lens 21 to the inner reflection surface 22b extends rearward in a slightly obliquely upward direction or a direction substantially parallel to the Z direction with respect to the viewpoint. The optical path portion P2 from the inner reflection surface 22b to the see-through mirror 23 extends forward in an obliquely downward direction. When a horizontal plane direction (an XZ plane) is used as a reference, the inclination of the optical path portion P2 is larger than the inclination of the optical path portion P1. The optical path portion P3 from the see-through mirror 23 to the pupil position PP extends rearward in a slightly obliquely upward direction or in a direction substantially parallel to the Z direction. In the illustrated example, a portion of the optical axis AX corresponding to the optical path portion P3 is about −10° in the +Z direction with a downward direction being negative. That is, the partially transmissive mirror 123 reflects the image light ML so that the optical axis AX or the optical path portion P3 is directed upward by a predetermined angle, that is, upward by about 10°. As a result, an emission optical axis EX which is an extension of a portion of the optical axis AX corresponding to the optical path portion P3 extends obliquely downward by about 10° with respect to a central axis HX parallel to the forward +Z direction. This is because the line of sight of a human being is stable in a slightly lowered eye state in which the line of sight is inclined downward by approximately 10° with respect to a horizontal direction. The central axis HX that extends in the horizontal direction with respect to the pupil position PP assumes a case in which the wearer US wearing the first display device 100A relaxes in an upright posture and faces the front and gazes in the horizontal direction or in a horizontal line.

In the first display unit 20a, the projection lens 21 includes a first lens 21o, a second lens 21p, and a third lens 21q. The projection lens 21 receives the image light ML emitted from the first display element 11a and causes it to be incident on the prism mirror 22. The projection lens 21 focuses the image light ML emitted from the first display element 11a into a state close to a parallel luminous flux. Optical surfaces of the first lens 21o, the second lens 21p, and the third lens 21q constituting the projection lens 21, that is, an incident surfaces and the emission surface are free curved surfaces or aspherical surfaces, have asymmetry with respect to the longitudinal direction parallel to the YZ plane and intersecting the optical axis AX with the optical axis AX interposed therebetween, and have symmetry with respect to the transverse direction or the X direction with the optical axis AX interposed therebetween. The first lens 21o, the second lens 21p, and the third lens 21q are formed of a resin, for example, but can also be formed of glass. An antireflection film can be formed at the optical surfaces of the first lens 21o, the second lens 21p, and the third lens 21q constituting the projection lens 21.

The prism mirror 22 is an optical member having a refracting and reflecting function that combines the functions of a mirror and a lens, and refracts and reflects the image light ML from the projection lens 21. The prism mirror 22 has an incident surface 22a corresponding to an incident portion, an inner reflection surface 22b as a reflection surface corresponding to a reflection portion, and an emission surface 22c corresponding to an emission portion. The prism mirror 22 emits the image light ML incident from the front so that it is bent in a direction inclined downward with respect to a direction in which an incident direction is reversed (a direction of the light source seen from the prism mirror 22). The incident surface 22a, the inner reflection surface 22b, and the emission surface 22c which are the optical surfaces constituting the prism mirror 22 have asymmetry with respect to the longitudinal direction parallel to the YZ plane and intersecting the optical axis AX with the optical axis AX interposed therebetween, and have symmetry with respect to the transverse direction or the X direction with the optical axis AX interposed therebetween. The optical surfaces of the prism mirror 22, that is, the incident surface 22a, the inner reflection surface 22b, and the emission surface 22c are, for example, free curved surfaces. The incident surface 22a, the inner reflection surface 22b, and the emission surface 22c are not limited to free curved surfaces, and may be aspherical surfaces. The prism mirror 22 may be formed of, for example, a resin, but may also be formed of glass. The inner reflection surface 22b is not limited to one that reflects the image light ML by total reflection, and may be a reflection surface formed of a metal film or a dielectric multilayer film. In this case, a reflection film formed of a single layer film or multilayer film formed of a metal such as Al or Ag is formed at the inner reflection surface 22b by vapor deposition or the like, or a sheet-like reflection film formed of a metal is affixed thereto. Although detailed illustration is omitted, an antireflection film can be formed at the incident surface 22a and the emission surface 22c.

The see-through mirror 23, that is, the first combiner 103a, is a curved plate-like reflecting optical member that functions as a concave surface mirror, reflects the image light ML from the prism mirror 22, and partially transmits external light OL. The see-through mirror 23 reflects the image light ML from the prism mirror 22 disposed in an emission region of the first projection optical system 12a toward the pupil position PP. The see-through mirror 23 has a reflection surface 23c and an outer surface 23o.

The see-through mirror 23 partially reflects the image light ML and enlarges an intermediate image formed at the light emission side of the emission surface 22c of the prism mirror 22. The see-through mirror 23 is a concave mirror that covers the pupil position PP at which the eye EY or the pupil is disposed, has a concave shape toward the pupil position PP, and has a convex shape toward the outside. The pupil position PP or an opening PPa thereof is referred to as eye point or eye box. The pupil position PP or the opening PPa corresponds to an emission pupil EP on the emission side of the first display unit 20a. The see-through mirror 23 is a collimator and converges main rays of the image light ML temporarily spread by imaging in the vicinity of the emission side of the prism mirror 22 of the first projection optical system 12a, which are the main rays of the image light ML emitted from each of points on the display surface 11d, to the pupil position PP. As a concave mirror, the see-through mirror 23 enables an intermediate image (not illustrated) formed at the first display element 11a, which is an image light generation device, and re-imaged by the first projection optical system 12a to be seen in an enlarged manner. More specifically, the see-through mirror 23 functions in the same manner as a field lens, and causes the image light ML from each of the points of the intermediate image (not illustrated) formed behind the emission surface 22c of the prism mirror 22 to be incident on the pupil position PP in a collimated state so as to be collected as a whole. The see-through mirror 23 needs to have a spread equal to or larger than the effective region EA corresponding to an angle of view (the sum of viewing angles in the vertical and horizontal directions with respect to the optical axis AX extending in the forward direction of the eye), from the viewpoint that it is disposed between the intermediate image and the pupil position PP. In the see-through mirror 23, an outer region extending to the outside of the effective region EA does not directly affect the imaging and thus can have an arbitrary surface shape, but from the viewpoint of ensuring an exterior like a spectacle lens, it is desirable that a curvature of the outer region be the same as a curvature of a surface shape of an outer edge of the effective region EA, or the curvature of the outer region continuously change from the outer edge.

The see-through mirror 23 is a transflective mirror plate having a structure in which a transmissive reflection film 23a is formed at a rear surface of a plate-like body 23b. The reflection surface 23c of the see-through mirror 23 has asymmetry with respect to the longitudinal direction parallel to the YZ plane and intersecting the optical axis AX with the optical axis AX interposed therebetween, and has symmetry with respect to the transverse direction or the X direction with the optical axis AX interposed therebetween. The reflection surface 23c of the see-through mirror 23 is, for example, a free curved surface. The reflection surface 23c is not limited to a free curved surface, and may be an aspherical surface. The reflection surface 23c needs to have a spread equal to or larger than the effective region EA. When the reflection surface 23c is formed in the outer region wider than the effective region EA, a difference in visibility is less likely to occur between an external image from behind the effective region EA and an external image from behind the outer region.

The reflection surface 23c of the see-through mirror 23 transmits some of light when the image light ML is reflected. Thus, because the external light OL passes through the see-through mirror 23, see-through view of the outside is enabled, and a virtual image can be superimposed on an external image. At this time, when the plate-like body 23b has a thickness of less than or equal to approximately a few millimeters, a change in magnification of the external image can be curbed to be small. A reflectance of the reflection surface 23c with respect to the image light ML and the external light OL is set to 10% or more and 50% or less in a range of an incident angle (corresponding to the effective region EA) of the assumed image light ML from the viewpoint of ensuring a brightness of the image light ML and facilitating observation of the external image by see-through. The plate-like body 23b which is a base material of the see-through mirror 23 is formed of, for example, a resin, and may also be formed of glass. The plate-like body 23b is formed of the same material as a support plate 61 that supports the plate-like body 23b from the surrounding thereof, and has substantially the same thickness as the support plate 61. The transmissive reflection film 23a is formed of, for example, a dielectric multilayer film configured of a plurality of dielectric layers of which a film thickness has been adjusted. The transmissive reflection film 23a may be a single-layer film or a multilayer film of a metal such as Al or Ag of which a film thickness has been adjusted. The transmissive reflection film 23a may be formed by laminating using deposition, for example, and may also be formed by affixing a sheet-like reflection film. An antireflection film is formed at an outer surface 23o of the plate-like body 23b.

A light transmission cover 104a is disposed in front of the see-through mirror 23. The light transmission cover 104a is a thin plate-like member having high light transmittance, and an upper end thereof is supported by the cover member 70, specifically, the front cover 71 illustrated in FIG. 2 and the like. The light transmission cover 104a has a convex shape toward the outside and has a uniform thickness. The light transmission cover 104a does not affect the imaging of the image light ML, and a curvature thereof can be arbitrarily set within a range in which it does not interfere with the see-through mirror 23. The light transmission cover 104a is as thin as about several millimeters or less and hardly affects observation of an external image. The light transmission cover 104a is formed of, for example, a resin, and an antireflection film or a hard coating layer may be formed thereon.

In describing the optical path, the image light ML from the first display element 11a is incident on the projection lens 21 and is emitted from the projection lens 21 in a substantially collimated state. The image light ML that has passed through the projection lens 21 is incident on the prism mirror 22, passes through the incident surface 22a while being refracted by it, is reflected by the inner reflection surface 22b with a high reflectance close to 100%, and is refracted again by the emission surface 22c. The image light ML from the prism mirror 22 once forms an intermediate image, is then incident on the see-through mirror 23 and is reflected by the reflection surface 23c with a reflectance of about 50% or less. The image light ML reflected by the see-through mirror 23 is incident on the pupil position PP at which the eye EY or pupil of the wearer US is placed. The external light OL that has passed through the light transmission cover 104a and has passed through the see-through mirror 23 and the support plate 61 therearound is also incident on the pupil position PP. In other words, the wearer US wearing the first display device 100A can observe a virtual image of the image light ML in a state in which it overlaps the external image.

Figure 5:
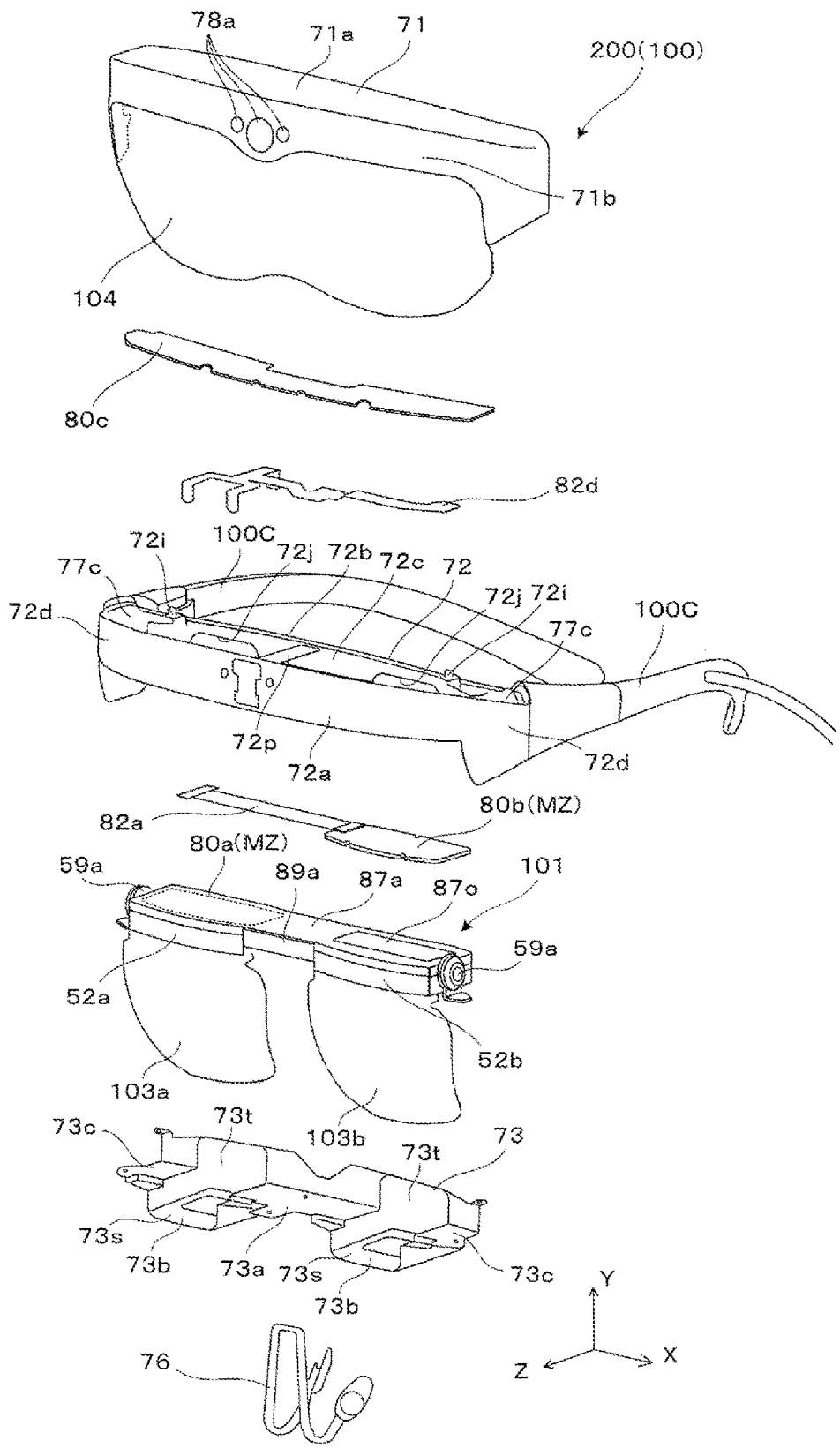
FIG. 5 is an exploded perspective view of the image display device.

The first circuit member 80a illustrated in FIG. 4 or the second circuit member 80b illustrated in FIG. 5 includes the display control device 88. The display control device 88 is a display control circuit, outputs a drive signal corresponding to an image to the first display elements 11a and the like, and controls display operations of the first display elements 11a and the like. The display control device 88 includes, for example, an IF circuit, a signal processing circuit, and the like, and causes a two-dimensional image display to be performed on the first display element 11a and the like according to image data or an image signal received from the outside. The display control device 88 may include a main substrate that controls the first display device 100A and the second display device 100B. The main substrate may have an interface function that communicates with the user terminal 90 illustrated in FIG. 1 and performs signal conversion on a signal received from the user terminal 90, and an integration function that links the display operation of the first display device 100A and the display operation of the second display device 100B. The HMD 200 or the image display device 100 that does not include the display control device 88 and the user terminal 90 is also an image display device.

The accessory component circuit member 80c illustrated in FIG. 4 is operated under the control of the display control device 88, and operates a camera 3a, an illuminance sensor 3b, and a proximity sensor 3c that are the accessory components illustrated in FIG. 2, and operates a proximity sensor 3d illustrated in FIG. 3. Specifically, the accessory component circuit member 80c captures an image of the front of the HMD 200 by the camera 3a, for example, and acquires a front image. In addition, the accessory component circuit member 80c detects brightness of the surrounding environment of the HMD 200 by the illuminance sensor 3b, and outputs it to the display control device 88 as information for controlling a display brightness, for example. The accessory component circuit member 80c detects an object approaching the HMD 200 from the front by the proximity sensor 3c, detects an object (specifically, a wearer) approaching the HMD 200 from the rear by the proximity sensor 3d, and outputs them to the display control device 88.

FIG. 5 is an exploded perspective view of the HMD 200 or image display device 100. An optical device 101 is inserted into the middle frame 72 from below, and is fixed to both ends of the middle frame 72 using bearing members 59a. In the optical device 101, the first metallic frame 52a and the second metallic frame 52b are coupled to each other, the upper side and the side surface thereof are covered with a shield member 87a, and a joint portion between the first metallic frame 52a and the second metallic frame 52b is also covered with the shield member 87a. The shield member 87a prevents electromagnetic interference. The first circuit member 80a is disposed between the first metallic frame 52a and the shield member 87a, and the second circuit member 80b is disposed between the second metallic frame 52b and the shield member 87a in a partially exposed state. The first and second circuit members 80a and 80b are circuit boards MZ. In the optical device 101, the circuit boards MZ are sandwiched between the shield member 87a and the first and second metallic frames 52a and 52b, so that waterproofing of the circuit boards MZ can be enhanced. The first circuit member 80a and the second circuit member 80b are coupled to each other by a flexible printed circuit (FPC) member 82a to be electrically communicable with each other. The lower cover 73 is assembled to the lower side of the optical device 101. A nose pad member 76 is fixed to a central portion of the lower cover 73 from below. The accessory component circuit member 80c is fixed to an upper portion of the middle frame 72 holding the optical device 101, and the FPC member 82d extending from the accessory component circuit member 80c is coupled to the second circuit member 80b, a camera device (not illustrated), or the like.

Figure 6:
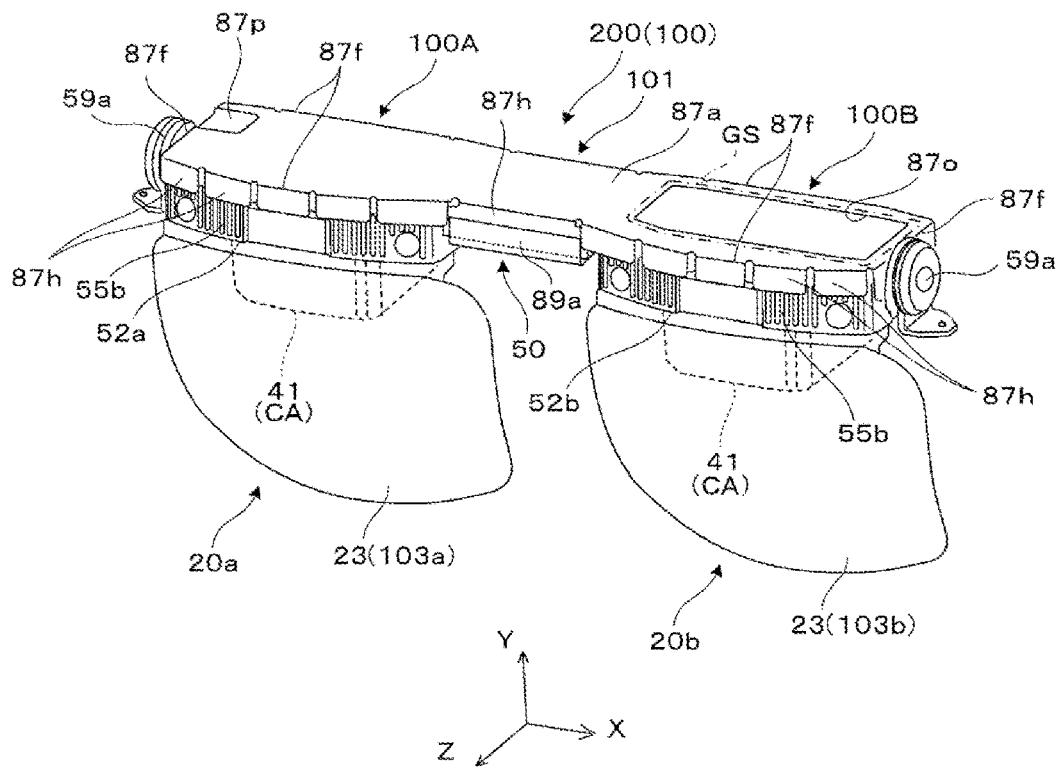
FIG. 6 is a perspective view illustrating an optical device.
Figure 7:
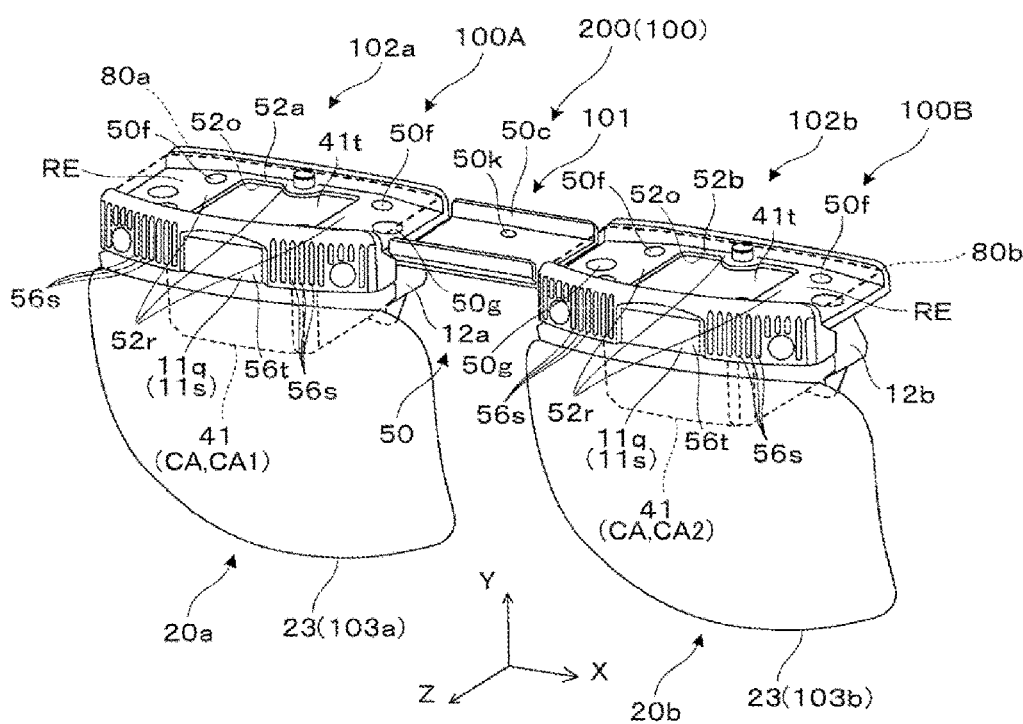
FIG. 7 is a perspective view illustrating a state in which a shield member is removed from the optical device of FIG. 6.

The optical device 101 will be described with reference to FIGS. 6 and 7. FIG. 6 is a perspective view illustrating a state in which the shield member 87a is fixed by an adhesive, and FIG. 7 is a perspective view illustrating a state in which the shield member 87a is removed. In the optical device 101, an optical case CA includes a first optical case CA1 for the right eye and a second optical case CA2 for the left eye.

In the shield member 87a illustrated in FIG. 6, a bent portion 87h is provided downward from a corner portion 87f. The corner portion 87f of the shield member 87a is fixed to an upper end of a support structure 50 to be filled with an adhesive on the inner side, thereby sealing a gap between the shield member 87a and the support structure 50. The shield member 87a is formed of a magnesium alloy, for example, and curbs emission of electromagnetic waves from the first circuit member 80a and the second circuit member 80b (refer to FIG. 5). Openings 87o and 87p are formed in the shield member 87a, so that an FPC member (not illustrated) coupled to the first circuit member 80a and the second circuit member 80b accommodated under the shield member 87a can be retracted, and heat dissipation from the circuit members 80a and 80b accommodated under the shield member 87a is facilitated. The openings 87o and 87p may be covered with a metallic material or a graphite sheet GS having high thermal conductivity and heat dissipation properties after the FPC member is retracted. As a result, it is possible to enhance the sealing property around the circuit members 80a and 80b. A peripheral seal member 89a is mounted on a portion between the first metallic frame 52a and the second metallic frame 52b to surround the bent portion 87h from below and in the forward and rearward direction. The peripheral seal member 89a seals the periphery of a joint 50c (refer to FIG. 7), which will be described below, to curb moisture entering an upper portion of the joint 50c and recessed portions on the metallic frames 52a and 52b.

In the first display device 100A illustrated in FIG. 7, the first metallic frame 52a is fixed to an upper portion 41t of the first display unit 20a illustrated in FIG. 4 using a fastener 50f such as a screw, and supports the first display unit 20a in a hanging manner. The first metallic frame 52a can be fixed by various methods other than screw fixation, such as fixation by caulking, fixation by an adhesive, fixation using fitting, a hanging method such as a socket type, a hanging method by hooking, and a bonding fixation.

A rectangular opening 52o is formed in the first metallic frame 52a, and a part of the periphery 52r of the rectangular opening 52o (specifically, three sides excluding the +Z side) is in contact with and in close contact with the upper portion 41t of the barrel 41 of the first display unit 20a. The first circuit member 80a is disposed in a recess RE on the first metallic frame 52a. The first metallic frame 52a is formed of, for example, a magnesium alloy. When the first metallic frame 52a is formed of a magnesium alloy, it is possible to provide an effect of cooling the first metallic frame 52a and the first display unit 20a by heat dissipation In the second display device 100B illustrated in FIG. 7, similarly to the first display device 100A, the second metallic frame 52b is fixed to the upper portion 41t of the second display unit 20b using a fastener 50f such as a screw or the like, and supports the second display unit 20b in a hanging manner. A rectangular opening 52o is formed in the second metallic frame 52b, and a part of the periphery 52r of the rectangular opening 52o (specifically, three sides excluding the +Z side) is in contact with and in close contact with the upper portion 41t of the barrel 41 of the second display unit 20b. The second circuit member 80b is disposed in a recess RE on the second metallic frame 52b. When the second metallic frame 52b is formed of a magnesium alloy, it is possible to provide an effect of cooling the second metallic frame 52b and the second display unit 20b by heat dissipation.

The support structure 50 includes, in addition to the first metallic frame 52a and the second metallic frame 52b, a joint 50c that couples the first metallic frame 52a and the second metallic frame 52b to relatively fix them. As in the first metallic frame 52a, the joint 50c is a metallic member such as a magnesium alloy, is coupled to one end portion of the first metallic frame 52a using a fastener 50g or the like, and is coupled to the other end portion of the second metallic frame 52b using a fastener 50g or the like. A fastening portion 50k for fixing the lower cover 73 is also provided on the joint 50c. The first metallic frame 52a in which the first display unit 20a is mounted and the second metallic frame 52b in which the second display unit 20b is mounted are fixed in a mutually optically aligned state via the joint 50c at the center. Since the two metallic frames 52a and 52b are coupled via the joint 50c in this way, the arrangement relationship between the two metallic frames 52a and 52b can be easily changed. In addition, when other components are incorporated, individual adjustment is possible, and integrated adjustment is also possible. An upper side of the joint 50c is covered with the shield member 87a, and a lower side thereof is covered with the peripheral seal member 89a.

Figure 8:
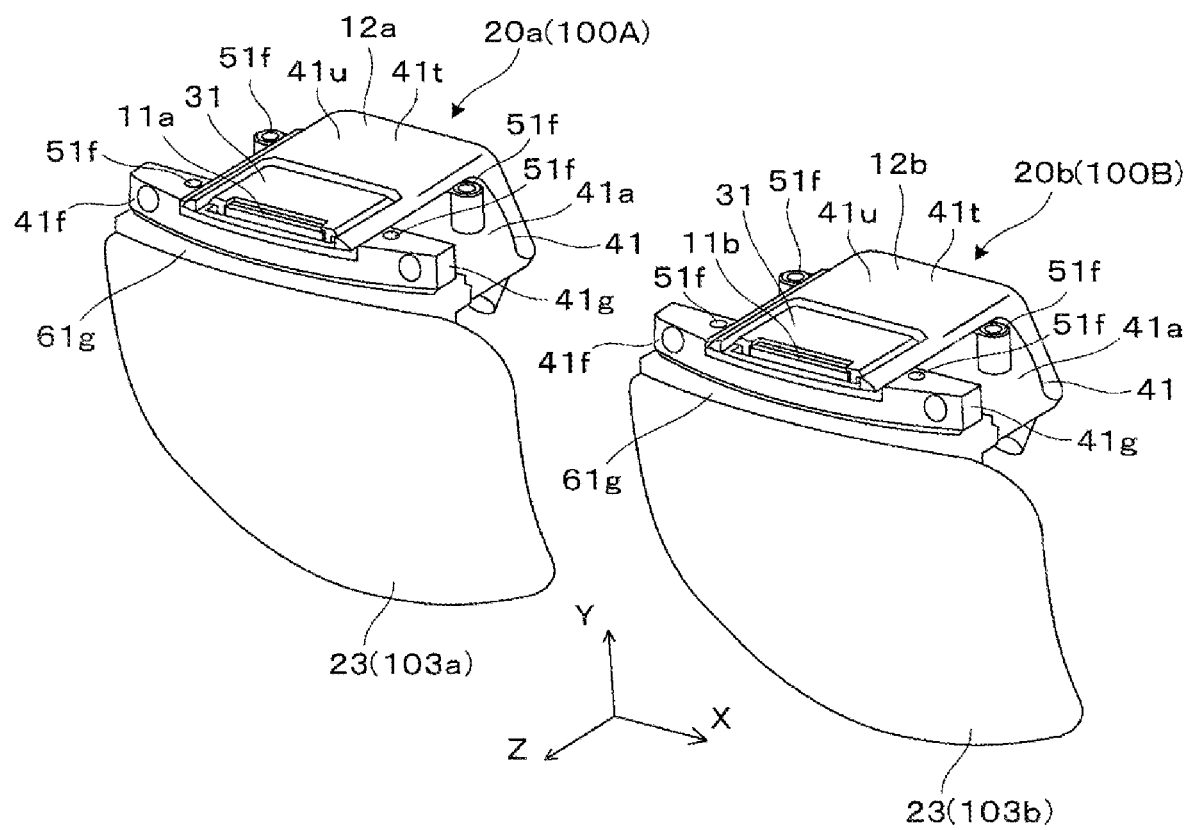
FIG. 8 is a perspective view of a pair of optical units.

FIG. 8 is a perspective view illustrating a state in which the support structure 50 is removed from the HMD 200 illustrated in FIG. 7. The first display unit 20a has the first projection optical system 12a and the first combiner 103a in an integrated state, and the second display unit 20b has the second projection optical system 12b and the second combiner 103b in an integrated state. In the first projection optical system 12a, the first combiner 103a is fixed to the barrel 41 by adhesion or the like in an aligned state. The barrel 41 of the first projection optical system 12a has a space for accommodating the first display element 11a, and supports the first display element 11a in an aligned state with respect to the projection lens 21 and the like illustrated in FIG. 2. In the second projection optical system 12b, the second combiner 103b is fixed to the barrel 41 by adhesion or the like in an aligned state. The barrel 41 of the second projection optical system 12b has a space for accommodating the second display element 11b, and supports the second display element 11b in an aligned state with respect to the projection lens 21 and the like illustrated in FIG. 2.

In the first display unit 20a, a fastening portion 51f provided in the barrel 41 is, for example, a screw hole, and the upper portion 41t of the barrel 41 can be fixed to the first metallic frame 52a by screwing a fastener 50f illustrated in FIG. 7. In the second display unit 20b, the fastening portion 51f provided in the barrel 41 is, for example, a screw hole, and the upper portion 41t of the barrel 41 can be fixed to the second metallic frame 52b by screwing the fastener 50f illustrated in FIG. 7.

Figure 9:
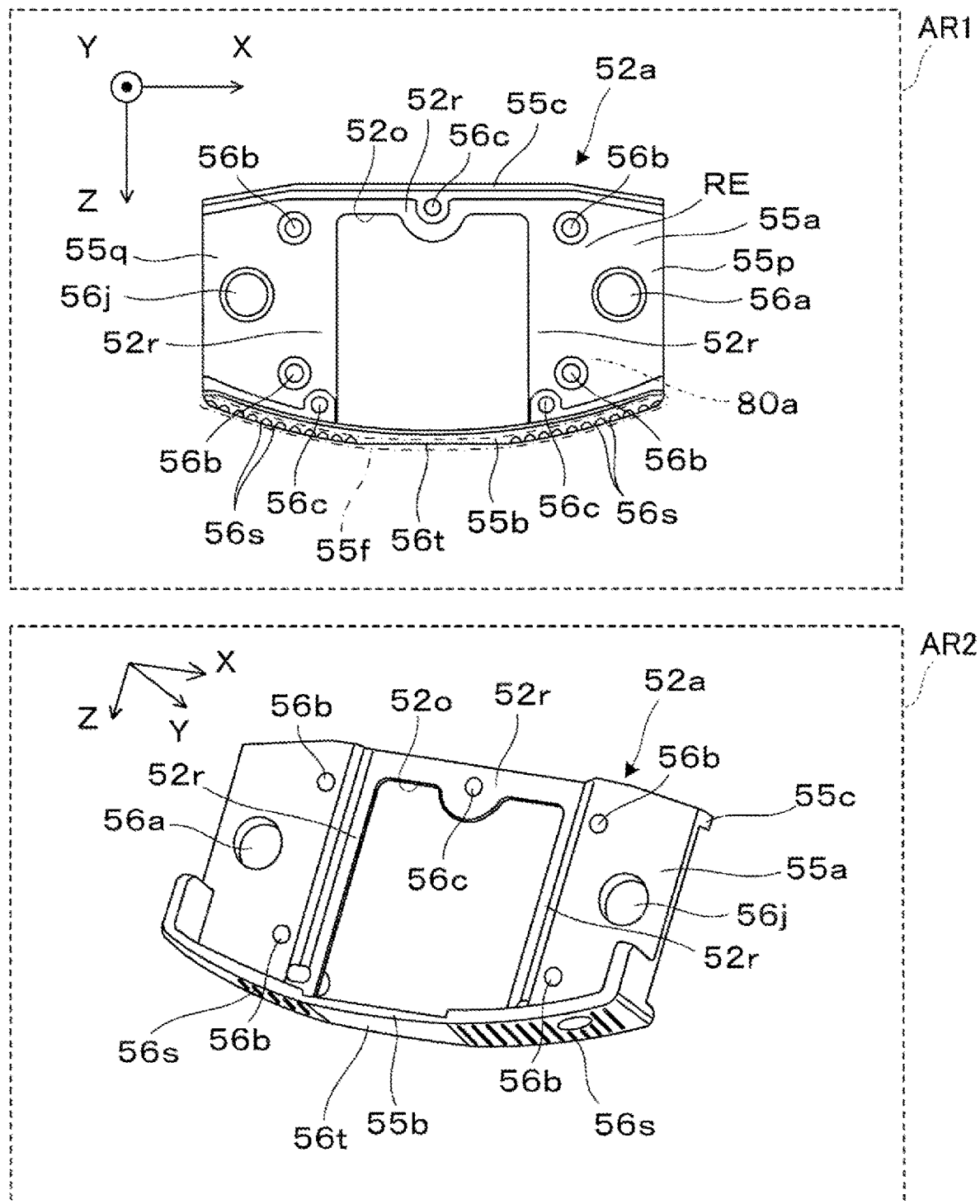
FIG. 9 is a plan view and a perspective view for describing a metallic frame supporting a display unit.

FIG. 9 is a diagram illustrating the first metallic frame 52a. In FIG. 9, a region AR1 is a plan view of the first metallic frame 52a, and a region AR2 is a perspective view of the back side of the first metallic frame 52a. The first metallic frame 52a includes a flat plate portion 55a having an opening 52o and having a substantially rectangular shape as a whole, and a pair of reinforcing protrusions 55b and 55c protruding upward from the flat plate portion 55a. The first reinforcing protrusion 55b disposed on the front side which is the +Z side is provided along the front side of a pair of sides extending in the longitudinal direction of the flat plate portion 55a in an outer edge of the flat plate portion 55a. The first reinforcing protrusion 55b protrudes to the upper side which is the +Y side and the lower side which is the −Y side, and extends in the transverse X direction as a whole while being slightly curved. In addition, the second reinforcing protrusion 55c disposed on the rear side which is the −Z side is provided along the rear side of the pair of sides extending in the longitudinal direction of the flat plate portion 55a in the outer edge of the flat plate portion 55a. The second reinforcing protrusion 55c protrudes only to the upper side which is the +Y side, and extends in the transverse X direction as a whole while being slightly curved. The pair of reinforcing protrusions 55b and 55c increase a structural strength of the first metallic frame 52a, and increase a strength of the flat plate portion 55a which is relatively weak against bending and twisting.

A planar portion 56t and a cooling fin structure 56s are formed at a front surface of the reinforcing protrusion 55b, that is, on a front portion 55f of the reinforcing protrusion 55b. A lead-out end 11q which is the other end of a heat dissipation sheet 11s described below is attached to the planar portion 56t (refer to FIG. 7). Due to the lead-out end 11q of the heat dissipation sheet 11s being attached to the front portion 55f away from the face of the wearer US, there is an effect of relatively lowering a temperature of a rear portion of the first metallic frame 52a, and thus a temperature of the HMD 200 or the rear side of the image display device 100 can be relatively lowered. A cooling fin structure 56s has a three dimensional shape in which ridges and grooves are alternately formed, and increases a contact area with air. The cooling fin structure 56s is disposed in the vicinity of the left and right sides of the planar portion 56t. The ridges and grooves constituting the cooling fin structure 56s extend in the longitudinal Y direction. In the cooling fin structure 56s, heat received by the planar portion 56t and diffused along the reinforcing protrusion 55b is radiated from the surfaces through air or radiated as infrared rays. Due to the cooling fin structure 56s being formed into a pattern shape extending in the longitudinal direction, a convective flow in the longitudinal direction can be easily generated, and it is possible to enhance the effect of heat dissipation to the air. The arrangement and structure of the planar portion 56t and the cooling fin structure 56s are merely examples, and the planar portion 56t and the cooling fin structure 56s can be provided in a place other than the reinforcing protrusion 55b.

In the first metallic frame 52a, a hole 56a formed in a side portion 55p at one end is used to couple the first metallic frame 52a with the joint 50c. In the first metallic frame 52a, a hole 56j formed in a side portion 55q at the other end is used to couple the first metallic frame 52a with the middle frame 72 (refer to FIG. 5) via a bearing member 59a. In the first metallic frame 52a, holes 56b formed at four locations around the opening 52o are used to fix the first metallic frame 52a to the upper portion 41t of the barrel 41. That is, the first metallic frame 52a can be stably fixed to the upper portion 41t of the barrel 41 by screwing the fastener 50f illustrated in FIG. 7 into the fastening portion 51f illustrated in FIG. 8 through the hole 56b.

In the first metallic frame 52a, a space above the flat plate portion 55a and sandwiched between the pair of reinforcing protrusions 55b and 55c is the recess RE for accommodating the first circuit member 80a. A height of an upper end of the first circuit member 80a may be higher than that of upper ends of the pair of reinforcing protrusions 55b and 55c. In the first metallic frame 52a, screw holes 56c formed at three locations in the periphery 52r of the opening 52o are used to fix the first circuit member 80a to the first metallic frame 52a.

Although not illustrated in the drawings, the second metallic frame 52b has a shape and structure inverted with respect to the left and right direction, that is, the ±X direction, of the first metallic frame 52a. The first metallic frame 52a itself may have a bilaterally symmetrical shape, and in this case, the second metallic frame 52b has the same shape as the first metallic frame 52a without being inverted.

A contour shape of the flat plate portion 55a of the first metallic frame 52a does not need to be a rectangular shape, and can be appropriately changed in accordance with the shape and application of the barrel 41. The shape of the opening 52o does not need to be rectangular. The pair of reinforcing protrusions 55b and 55c are not limited to those extending along the longitudinal side of the flat plate portion 55a, and may extend along a part of the longitudinal side of the flat plate portion 55a, may extend along a side other than the longitudinal side, or may be provided in a rib shape inside a portion other than the side.

Figure 10:
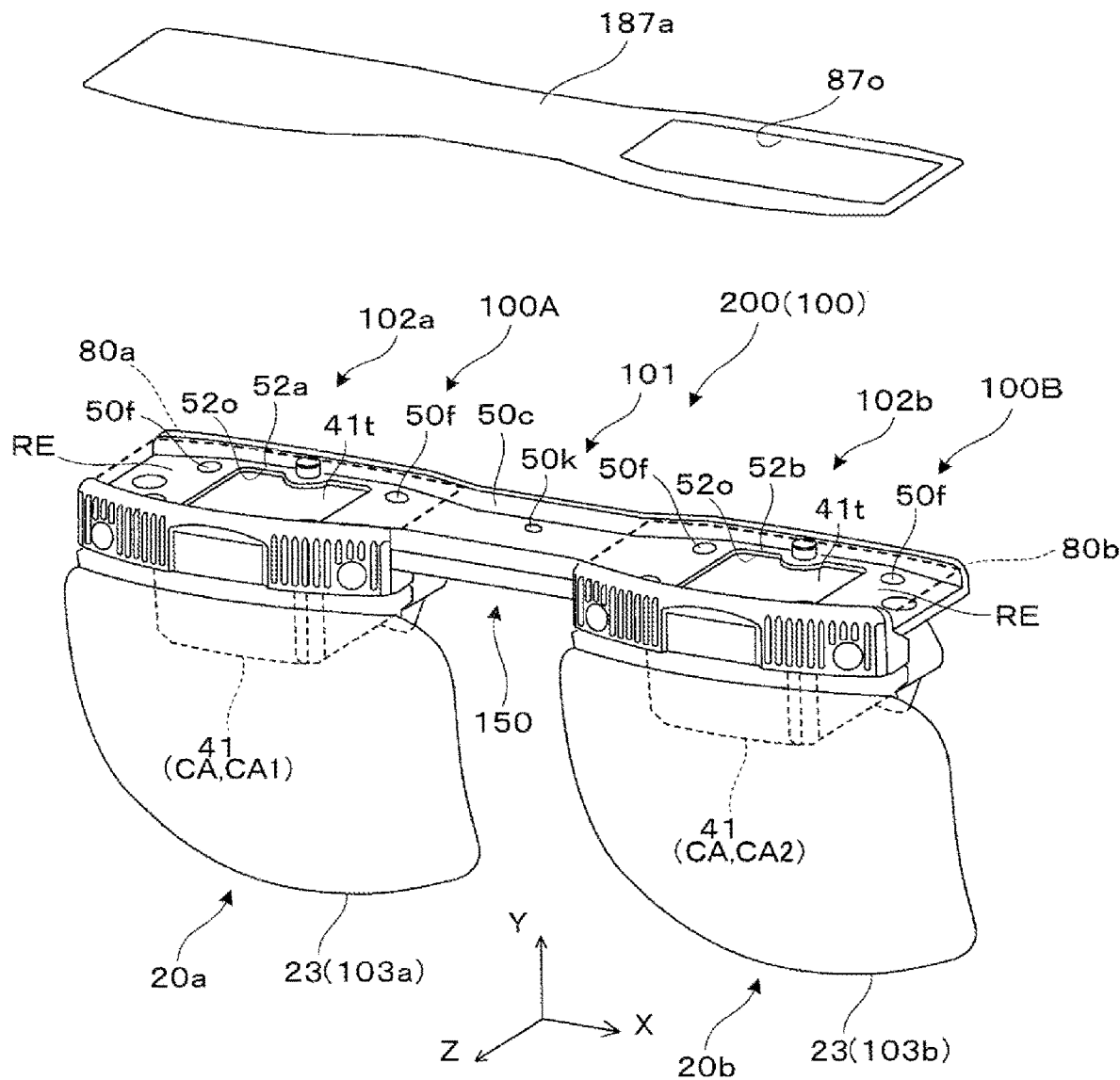

FIG. 10 is a perspective view illustrating a modified example of the support structure 50 illustrated in FIG. 7. In the optical device 101 illustrated in FIG. 10, the optical case CA includes a first optical case CA1 for the right eye and a second optical case CA2 for the left eye. The support structure 150 illustrated in FIG. 10 is a member in which the first metallic frame 52a, the second metallic frame 52b, and the joint 50c are integrally formed. That is, the support structure 150 including the first and second metallic frames 52a and 52b is an integrated member that supports the first optical case CA1 and the second optical case CA2. Thus, shapes of the first and second metallic frames 52a and 52b can be simplified. A bent portion 87h provided on the outer periphery of the shield member 87a illustrated in FIG. 6 is not present on the outer periphery of a shield member 187a of the modified example.

Figure 11:
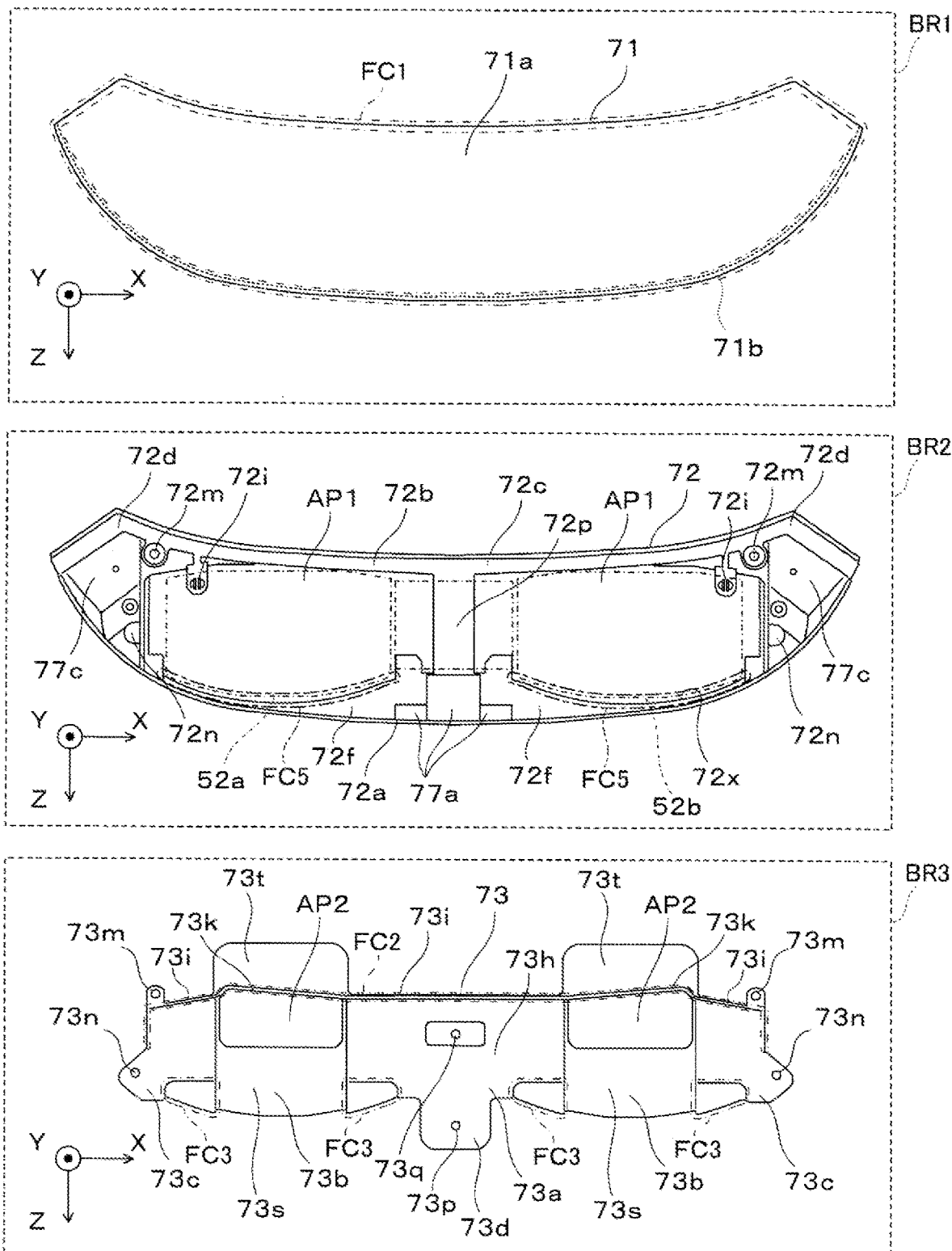
FIG. 11 is a plan view of an upper cover, a plan view of a middle cover, and a plan view of a lower cover.

FIG. 11 is a plan view of components of the cover member 70 constituting the exterior. In FIG. 11, a region BR1 is a plan view of the front cover 71, a region BR2 is a plan view of the middle frame 72, and a region BR3 is a plan view of the lower cover 73. The front cover 71 is formed of a metal such as SUS, but may be formed of a resin material. The middle frame 72 is formed of a resin material, but may be formed of a metal. The lower cover 73 is formed of a metal such as SUS, but may be formed of a resin material.

Referring also to FIG. 5, the front cover 71 has a top plate 71a and a front plate 71b. The top plate 71a is wide in the forward and rearward direction at the center and gradually decreases in the forward and rearward width at both left and right ends. A vertical width of the front plate 71b increases at both left and right ends. At the center of the front plate 71b, there is formed an opening 78a for exposing accessory components such as a camera. The front cover 71 has a uniform thickness, and a contour of the front cover 71 in plan view is substantially the same as that of the middle frame 72.

Referring also to FIG. 5, the middle frame 72 has a front plate 72a, a rear frame 72b, a rear plate 72c, an end portion 72d, and a lower plate region 72f. The front plate 72a has a substantially uniform vertical width. At the center of the front plate 72a, a plurality of storage chambers 77a for storing accessory components such as a camera are provided to protrude from a back surface to the −Z side. The upper end side of the front plate 72a is in contact with or fitted to the front plate 71b of the front cover 71. The rear frame 72b is provided on the upper end side and is in contact with or fitted to a rear edge of the top plate 71a of the front cover 71. Although details will be described below, a first seal member SW1 is provided at a first facing portion FC1 at which the front cover 71 and the middle frame 72 are in contact with or fitted to each other (refer to FIG. 20). The first facing portion FC1 is disposed to make substantially one round on a side surface of the front cover 71 or the middle frame 72, and the first seal member SW1 is waterproofed or dustproofed on an inner side surface of the exterior case 7. A pair of pin-like protrusions 72i formed at the rear frame 72b are for fixing the accessory component circuit member 80c illustrated in FIG. 5. The center of the front plate 72a and the center of the rear frame 72b are coupled by a bridge 72p. The rear plate 72c is provided to protrude downward, that is, to the −Y side from the rear frame 72b. The rear plate 72c has a notch 72j at two locations, and a vertical width thereof is reduced at the notch 72j. An end portion 72d is coupled to both ends of the front plate 72a, and is coupled to both ends of the rear frame 72b or the rear plate 72c. A recessed portion 77c for accommodating electronic components (not illustrated) is formed in the end portion 72d. A fastening portion 72m for coupling with the front cover 71 and the lower cover 73 and a fastening portion 72n for coupling with the lower cover 73 are provided at the end portion 72d. Further, the bearing member 59a of the optical device 101 is fixed to the lower surface side by the fastening portion 72n. The lower plate region 72f extends rearward, that is, to the −Z side, from a lower end of the central portion of the front plate 72a. Two openings AP1 are formed in the middle frame 72 in plan view, and the first metallic frame 52a and the second metallic frame 52b of the support structure 50 can be accommodated therein.

Referring also to FIG. 5, the lower cover 73 has a central portion 73a, a barrel accommodating portion 73b, and an end portion 73c. The central portion 73a has a bottom wall 73h and a rear wall 73i. A protruding region 73d is formed at the bottom wall 73h. The protruding region 73d and a side portion on the root side thereof are disposed to partially overlap the lower plate region 72f of the middle frame 72, and are in contact with or fitted to the lower plate region 72f. A fastening portion 73p for fixing the lower cover 73 to the lower plate region 72f of the middle frame 72 is provided at the protruding region 73d. A fastening portion 73q for fixing the nose pad member 76 and the joint 50c to the lower cover 73 is provided at a main body of the bottom wall 73h. The rear wall 73i is disposed near the outer side of the rear plate 72c of the middle frame 72, or is in contact with or fitted to the outer side of the rear plate 72c. The rear wall 73i is also formed at the end portion 73c. A pair of barrel accommodating portions 73b are provided to sandwich the central portion 73a, and have a downward protruding portion 73s and a rearward protruding portion 73t. The barrel accommodating portion 73b is a portion that covers the barrel 41 of the first projection optical system 12a or the second projection optical system 12b, and has an opening AP2. The opening AP2 is provided corresponding to the emission port 41o of the barrel 41, and allows the image light to pass therethrough. An upper end 73k of the rearward protruding portion 73t is in contact with or fitted to the rear frame 72b of the middle frame 72. Although details will be described below, a second seal member SW2 is provided at a second facing portion FC2 at which the middle frame 72 and the lower cover 73 are in contact with or fitted to each other (refer to FIG. 20). The second facing portion FC2 is waterproofed or dustproofed at a joint surface on the rear side of the exterior case 7. A fastening portion 73m for fixing the lower cover 73 to the fastening portion 72m at the top plate 71a of the front cover 71 or the end portion 72d of the middle frame 72, and a fastening portion 73n for fixing the lower cover 73 to the fastening portion 72n at the end portion 72d of the middle frame 72 are provided at the end portion 73c.

Figure 12:
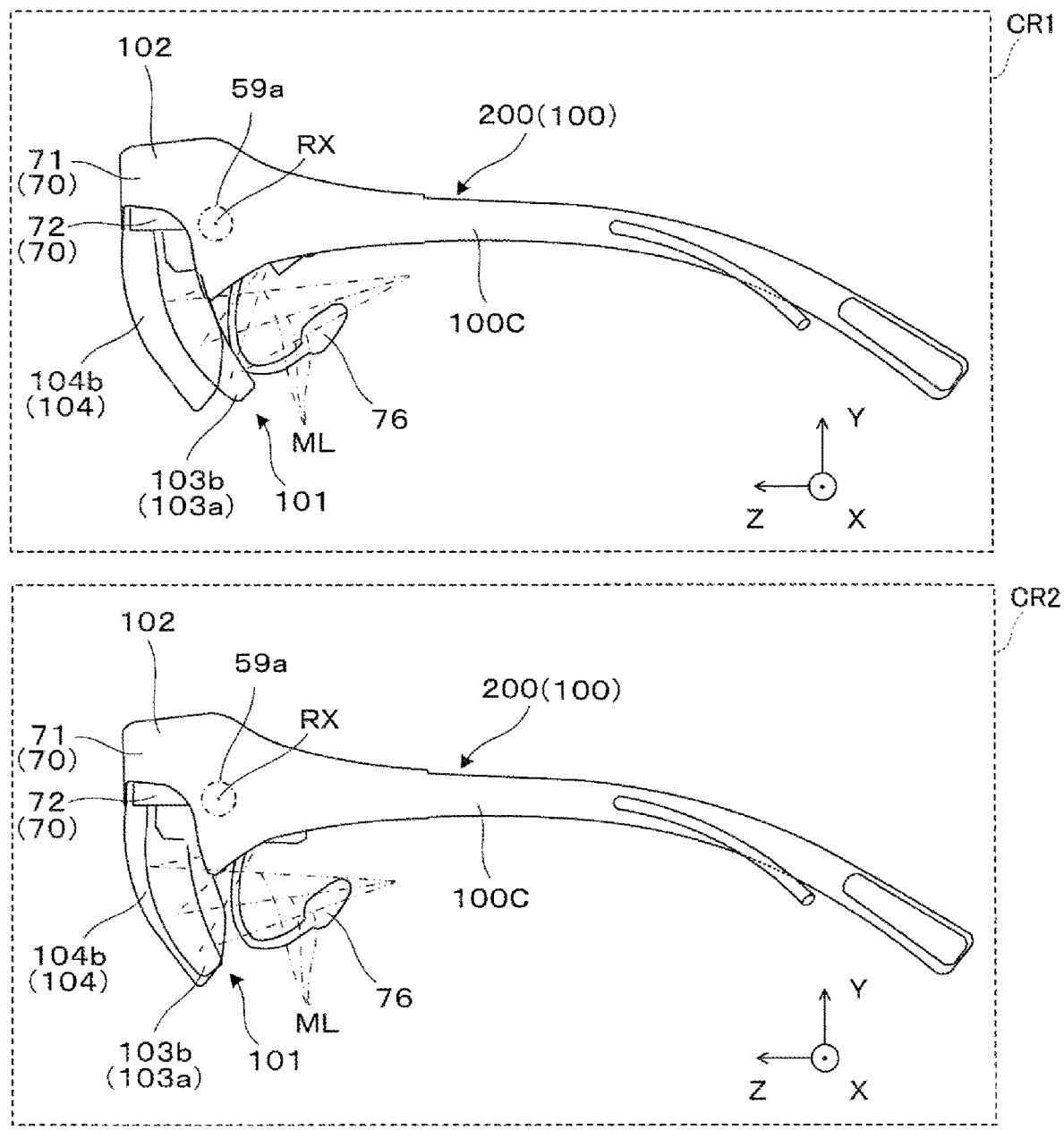
FIG. 12 is a side view for describing a change in posture of the optical device.

FIG. 12 is a side view of the HMD 200 or the image display device 100, and is a diagram illustrating an angle change of the optical device 101. In FIG. 12, a region CR1 indicates a first state of the optical device 101, and a region CR2 indicates a second state of the optical device 101. The optical device 101 is supported by the bearing member 59a to be rotatable about a rotation axis RX extending in parallel with the X-axis, and can change an angular posture thereof with an upper limit of about 5 to 10°. In this case, an angle of the optical device 101 with respect to the cover member 70 or the middle frame 72 changes, in the first state, the combiners 103a and 103b are separated from the light transmission covers 104a and 104b, and in the second state, the combiners 103a and 103b are relatively close to the light transmission covers 104a and 104b. In the case of the first state, a virtual image is observed downward on the assumption that a position of the eye is located on the relatively upper side. In the case of the second state, the virtual image is observed on the relatively upper side on the assumption that the position of the eye is located on the relatively lower side. The visibility can be improved by allowing the rotation of the combiner 103.

Figure 13:
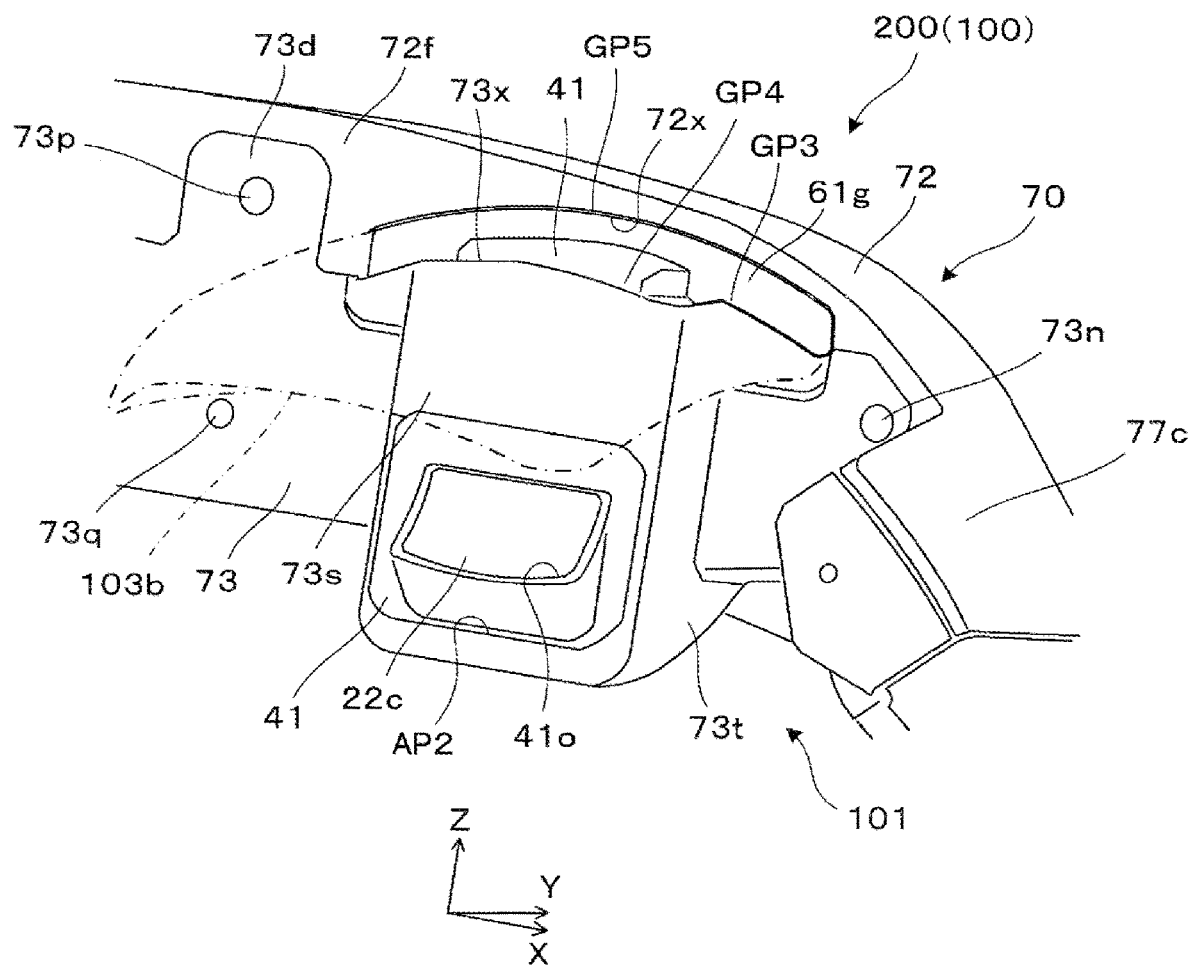
FIG. 13 is a perspective view of the back side of the image display device.

FIG. 13 is a partial perspective view of the back surface side of the HMD 200 or image display device 100. The optical device 101 is movable with respect to the middle frame 72 and the lower cover 73, and has gaps GP3, GP4, and GP5 between the middle frame 72 and the lower cover 73. More specifically, the gap GP5 is formed between the front side of the upper end 61g of each of the combiners 103a and 103b and a rear end 72x of the lower plate region 72f of the middle frame 72. Further, the gaps GP3 and GP4 are formed between the upper ends 61g of each of the combiners 103a and 103b and a front end 73x of the downward protruding portion 73s of the lower cover 73. Although the details will be described below, it is desirable that the gaps GP3, GP4, and GP5 are set to achieve dust-proof and waterproof while considering a size of a flow path to the inside of the cover member 70 and a method of bending a flow path to the inside of the cover member 70.

Figure 14:
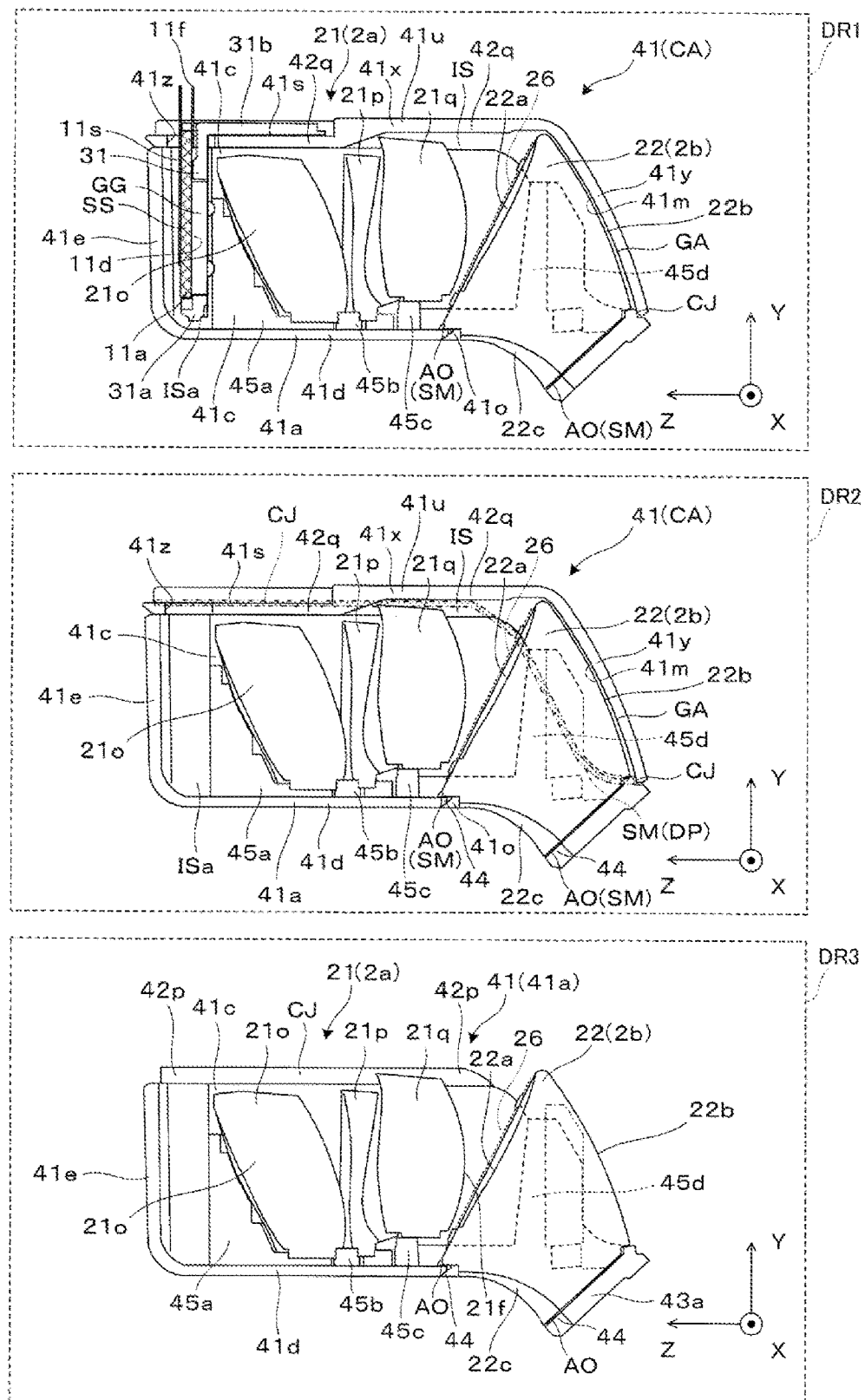

The structure of the barrel 41 incorporated in the optical device 101 illustrated in FIG. 7 and the like will be described with reference to FIG. 14. In FIG. 14, a region DR1 is a side cross-sectional view of the barrel 41 and the first display element 11a and the optical members 2a and 2b held by the barrel 41, a region DR2 is a side cross-sectional view of a state in which the first display element 11a and a holder 31 are removed, and a region DR3 is a side cross-sectional view of a state in which a barrel cover 41u is further removed.

The barrel 41 includes a barrel main body 41a and the barrel cover 41u, accommodates a first optical member 2a, and holds a second optical member 2b. The barrel main body 41a and the barrel cover 41u are formed of a polycarbonate resin in consideration of support accuracy and strength of the optical elements fixed therein. The barrel main body 41a is a bathtub-like vessel of which an upper portion is open, and has the emission port 41o at a part of the bottom. The barrel cover 41u is fixed to cover the barrel main body 41a from above. The barrel main body 41a includes two side plate members 41c, a bottom plate member 41d, and a front plate member 41e. The two side plate members 41c extend substantially parallel to an off-axis plane (parallel to the YZ plane) in which the optical axis AX extends and are spaced apart from each other. The bottom plate member 41d extends substantially along the XZ plane perpendicular to the off-axis plane (parallel to the YZ plane) in which the optical axis AX extends, and the emission port 41o is provided on the rear end side. The front plate member 41e couples a front end of the bottom plate member 41d to front ends of the two side plate members 41c.

As illustrated in FIG. 8, the barrel main body 41a has two protruding portions 41f and 41g extending in the transverse direction or the ±X direction to protrude outward from upper portions of the two side plate members 41c. The protruding portions 41f and 41g are portions for fixing the upper end 61g of the first combiner 103a, and are disposed to face a back surface of the reinforcing protrusion 55b of the first metallic frame 52a illustrated in FIG. 7.

Referring back to FIG. 14, on the inner side of one of the side plate members 41c, there are formed guide convex portions 45a, 45b, 45c, and 45d having steps, as protrusions for supporting a first lens 21o, a second lens 21p, and the third lens 21q which constitute the first optical member 2a, and the prism mirror 22 of the second optical member 2b.

Figure 15:
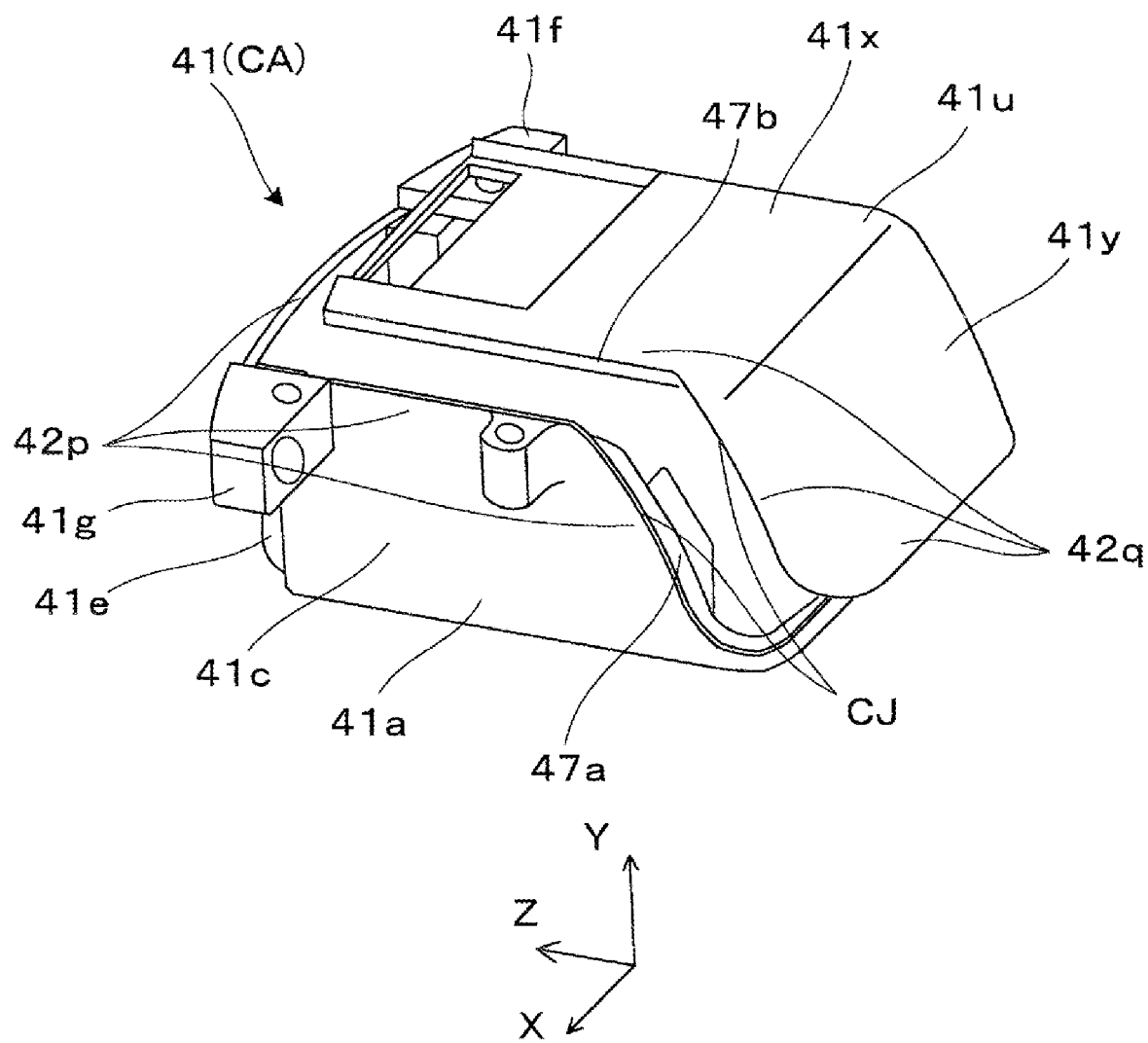
FIG. 15 is an exploded perspective view of the barrel.

Although not illustrated in the drawings, guide protrusions similar to the guide convex portions 45a, 45b, 45c, and 45d are formed at an inner surface of the other side plate member 41c (refer to FIG. 15). The first lens 21o is positioned in a biased state by the two first guide convex portions 45a provided on the inner surfaces of the two side plate members 41c and is supported by the barrel main body 41a. Similarly, the second lens 21p is positioned by the second guide convex portion 45b and supported by the barrel main body 41a, the third lens 21q is positioned by the third guide convex portion 45c and supported by the barrel main body 41a, and the prism mirror 22 is positioned by the fourth guide convex portion 45d and supported by the barrel main body 41a. When the optical elements 21o, 21p, 21q, and 22 are positioned by the guide convex portions 45a, 45b, 45c, and 45d, positioning surfaces of the optical elements 21o, 21p, 21q, and 22 are brought into contact with a plurality of positioning surfaces formed at the guide convex portions 45a, 45b, 45c, and 45d, and contact portions or peripheries thereof are fixed with an adhesive. A method for fixing the prism mirror 22 and the like to the barrel main body 41a is not limited to the above-described method using the bias at the contact surface, but may be replaced with a method using fitting or other various methods.

The barrel cover 41u is disposed on the opposite side of the bottom plate member 41d and covers the inside of the barrel main body 41a to form a storage space IS. The barrel cover 41u includes a top plate 41x and a rear plate 41y. The top plate 41x extends parallel to the XZ plane, and the rear plate 41y is disposed to be inclined so as to cover the outer side of the inner reflection surface 22b of the prism mirror 22 of the second optical member 2b. In the barrel cover 41u, a positioning holder pedestal 41s lowered by a predetermined height from the periphery is formed at the front +Z side, and an insertion port 41z is formed in front of the holder pedestal 41s. The holder pedestal 41s provided on the barrel cover 41u faces a base plate 31b of the holder 31, which will be described below, at the time of and after assembly as described below. The base plate 31b is fixed to the barrel 41 while covering the insertion port 41z. An inner surface 41m of the rear plate 41y is inclined with respect to the XZ plane and the XY plane, and extends along the inner reflection surface 22b of the prism mirror 22 to the vicinity of the inner reflection surface 22b. A uniform gap GA is formed between the outer side of the inner reflection surface 22b and the inner surface 41m of the rear plate 41y.

As illustrated in FIG. 15, fitting structures 47a and 47b such as steps are provided between an outer edge 42q extending along an outer periphery of the barrel cover 41u and an upper end 42p of the barrel main body 41a to achieve mutual positioning. The outer edge 42q of the barrel cover 41u and the upper end 42p of the barrel main body 41a form a coupling portion CJ between the barrel main body 41a and the barrel cover 41u. In the coupling portion CJ, a gap between the outer edge 42q of the barrel cover 41u and the upper end 42p of the barrel main body 41a, that is, a gap between the fitting structures 47a and 47b and the outer edge 42q or the upper end 42p is filled with a seal member SM which functions as an adhesive material or a sealing material (refer to a region DR2 in FIG. 14). In this case, airtightness of the storage space IS can be enhanced. The seal member SM provided along the outer edge 42q of the barrel cover 41u serves to seal the barrel 41 together with the seal member SM (described below) provided around the insertion port 41z and the emission port 41o. The waterproof property of the image display device 100 can be improved by sealing the barrel 41 which is the optical case CA.

Referring to FIG. 14, a diaphragm plate member 26 is disposed in the barrel 41 between the first optical member 2a and the second optical member 2b. In the illustrated case, the diaphragm plate member 26 is mounted adjacent to the incident surface 22a of the prism mirror 22.

A gap between an outer edge of the emission surface 22c of the prism mirror 22 and an edge portion 44 of the emission port 41o on the inner side is filled with a seal member SM that functions as an adhesive or a sealing material. The seal member SM seals between the emission port 41o of the barrel main body 41a and the periphery of the second optical member 2b or the emission surface 22c of the prism mirror 22. In this case, the emission surface 22c of the second optical member 2b is exposed to the outside, but an optical surface optically upstream of the emission surface 22c of the second optical member 2b is protected by the dustproof and waterproof structure of the barrel 41. The seal member SM filled along the emission port 41o of the barrel main body 41a is an elastic adhesive AO. The elastic adhesive AO is, for example, a silicone-based photo-curable resin that is cured by curing light such as UV light, but has elasticity even after curing. The elastic adhesive AO enables the emission port 41o to be dustproofed and waterproofed.

In the barrel 41, the first display element 11a supported by the holder 31 is inserted into a space ISa facing the front plate member 41e from above through the insertion port 41z and fixed in a positioned state. The barrel 41 is sealed by the holder 31 or the like. In this case, since the first display element 11a is disposed in the barrel 41, the first display element 11a is less likely to be affected by an impact from the outside, and a situation in which misalignment occurs due to an operation error in a manufacturing process is less likely to occur. The first display element 11a is disposed by the holder 31 at the front end of the barrel 41, that is, the optical case CA in the +Z direction so that the display surface 11d faces rearward corresponding to the −Z direction.

Figure 16:
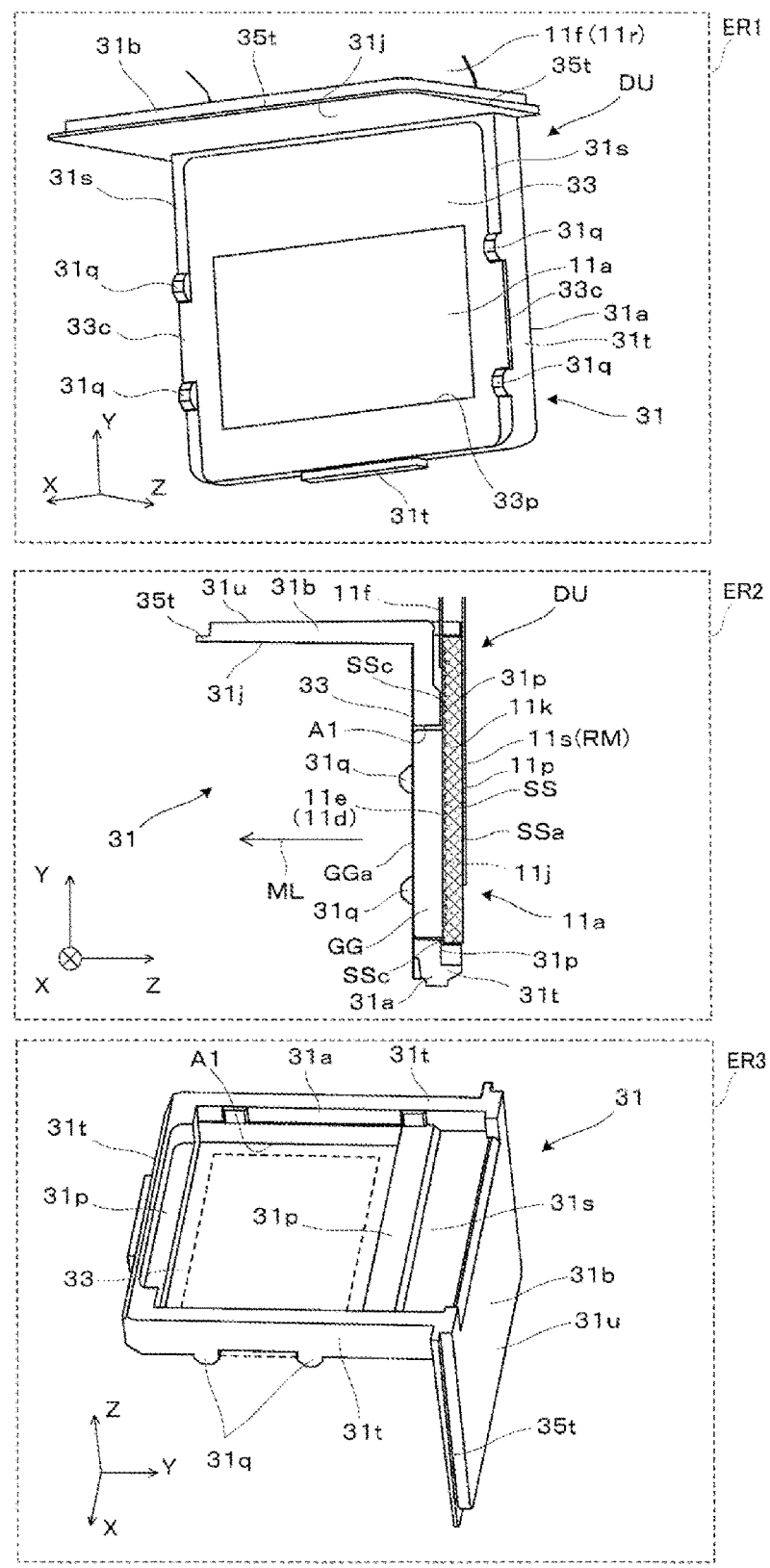
FIG. 16 is a perspective view and a side cross-sectional view of the front side, and a perspective view of the back side illustrating a display unit.

FIG. 16 is a diagram illustrating a display unit DU in which the first display element 11a is assembled to the holder 31. In FIG. 16, a region ER1 is a perspective view illustrating the front side of the display unit DU, a region ER2 is a side cross section of the display unit DU, and a region ER3 is a perspective view illustrating the back side of the holder 31.

In the illustrated display unit DU, the first display element 11a and a light shielding plate 33 associated therewith are fixed to a holder 31 and are positioned relative to each other.

The first display element 11a has a plate-like main body portion 11k and a flexible printed circuit (FPC) portion 11f that is coupled to an upper portion of the main body portion 11k and extends upward. In these portions, the main body portion 11k includes a silicon substrate SS in which a driving circuit 11j is formed and forming an exterior of the main body portion 11k, a light emission layer 11e which is an organic EL element containing an organic EL material and generates light of a color needed for image light ML, and a protective glass GG for sealing that seals the light emission layer 11e in cooperation with the silicon substrate SS. Here, the light emission layer 11e corresponds to the display surface 11d. The first display element 11a emits the image light ML to the protective glass GG side by performing a light emission operation in accordance with a driving signal received from the FPC portion 11f. An introduction end 11p which is one end of a flexible or elastic heat dissipation sheet 11s is attached to on the back surface SSa of the silicon substrate SS. The heat dissipation sheet 11s serves to conduct heat from the first display element 11a to the first metallic frame 52a illustrated in FIG. 7. The heat dissipation sheet 11s is a heat dissipation member RM formed of, for example, graphite and is bonded to a back surface SSa of the silicon substrate SS using an adhesive having high thermal conductivity.

The holder 31 is a member formed of, for example, a resin having a light shielding property, and has an exterior bent in an L-shape in side view. The holder 31 includes a support frame 31a that supports the first display element 11a, and a base plate 31b that is coupled to an upper portion of the support frame 31a and extends in a direction intersecting (for example, orthogonal to) the support frame 31a. The support frame 31a is inserted into the barrel 41 through the insertion port 41z formed in the barrel 41 while supporting the first display element 11a (refer to FIG. 14). The base plate 31b is coupled to the root side of the support frame 31a, extends forward (that is, to the −Z side) corresponding to the light emission side, and is not inserted into the barrel 41. The support frame 31a has a rectangular exterior and includes a flat plate portion 31s and a frame portion 31t. An upper end of the flat plate portion 31s is coupled to the base plate 31b. The frame portion 31t has a U shape and surrounds the first display element 11a in the left and right direction and a lower direction. The support frame 31a has a rectangular opening Al surrounded by the flat plate portion 31s and the frame portion 31t. The protective glass GG of the first display element 11a is disposed to be fitted into the opening Al. Inside the support frame 31a, two support regions 31p extending parallel to the transverse X direction are formed in an upper portion and a lower portion in the Y direction. The upper support region 31p is formed as a ridge on the back surface side of the flat plate portion 31s, and the lower support region 31p is formed as a step on the back surface side of the frame portion 31t. The both support regions 31p are bonded to the upper and lower surface regions SSc in the silicon substrate SS of the first display element 11a via an adhesive. As a result, the first display element 11a is supported in a state in which it is indirectly positioned with respect to the support frame 31a, and the display surface 11d of the first display element 11a can be brought into a predetermined state in which it is positioned substantially parallel to the XY plane. The base plate 31b of the holder 31 has a rectangular flat plate exterior, and a lower surface 31j extends in parallel with the XZ plane. The base plate 31b is placed on the holder pedestal 41s formed at the barrel cover 41u of the barrel 41, and is fixed to the holder pedestal 41s after positioning (refer to FIG. 14 and the like). In an outer peripheral portion of the base plate 31b, thin portions 35t are formed at three sides of the rear side, that is, the −Z side, and the transverse side, that is, the ±X side. An upper surface 31u of the base plate 31b is smooth and planar in order to facilitate suction and support by an arm of a three dimensional driving device for positioning.

The light shielding plate 33 is fixed to the support frame 31a of the holder 31 using an adhesive or a cohesive material. The light shielding plate 33 is a light shielding diaphragm having a rectangular opening 33p, and is formed of a metal, a resin, or the like having a light shielding property. The effective image light ML emitted from the display surface 11d of the first display element 11a passes through the opening 33p without being blocked by the light shielding plate 33. When the light shielding plate 33 is fixed, positioning is performed so that four protrusions 31q formed at the support frame 31a grip protruding portions 33c formed at the left and right sides of the light shielding plate 33 from above and below.

Figure 17:
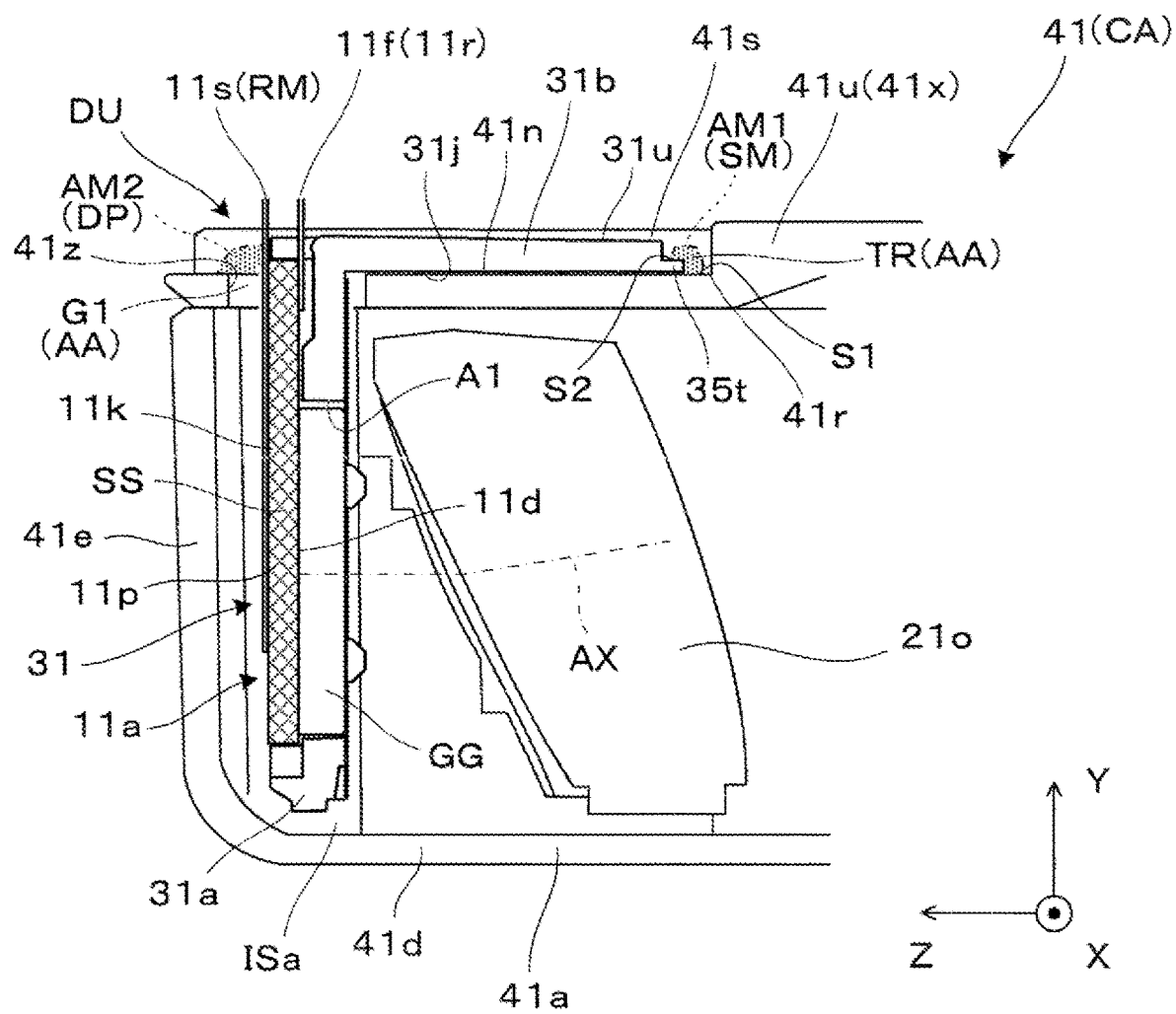
FIG. 17 is an enlarged cross-sectional view of a barrel front portion.
Figure 18:
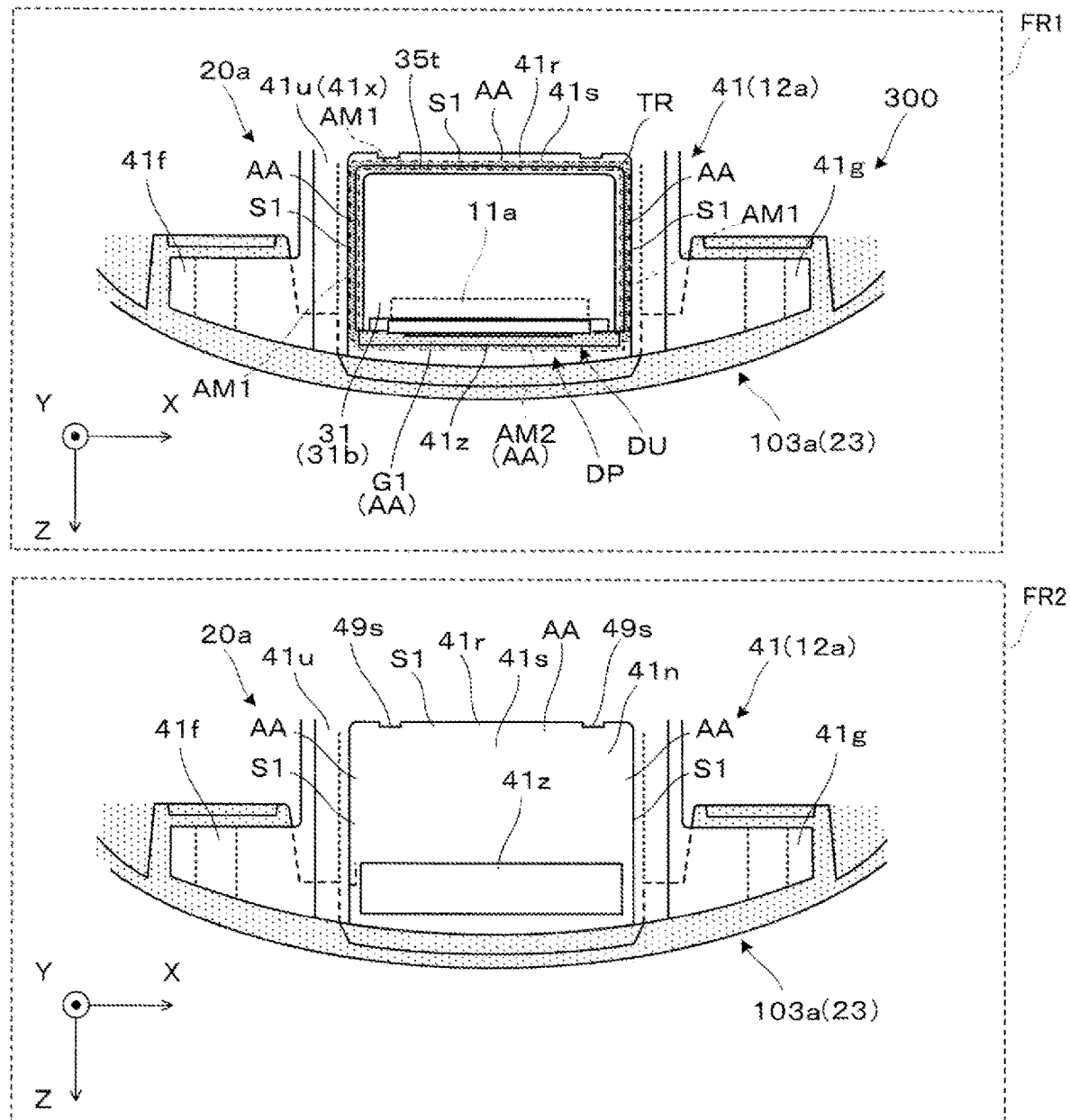
FIG. 18 is a plan view of an optical unit.

The fixing of the display unit DU to the barrel 41 will be described with reference to FIGS. 17 and 18. FIG. 17 is an enlarged cross-sectional view illustrating a front portion of the barrel 41, and FIG. 18 is a view illustrating assembly of the optical unit 300. In FIG. 18, a region FR1 is a plan view illustrating a state in which the display unit DU is assembled to the barrel 41, and a region FR2 is a plan view illustrating a state before the display unit DU is assembled. Here, an assembly in which the display unit DU including the first display element 11a is assembled to the first display unit 20a in which the barrel 41 incorporating the first projection optical system 12a and the first combiner 103a are combined is referred to as an optical unit 300.

A step S1 is formed in the left, right, and rear edge portions 41r of the holder pedestal 41s formed at the top plate 41x of the barrel cover 41u which is an upper surface of the barrel 41. The step S1 of the holder pedestal 41s and the vicinity thereof hold an adhesive AM1 that couples the holder 31 and the barrel 41 together. The adhesive AM1 is, for example, an acrylic ultraviolet curable resin. The adhesive AM1 is cured after the holder 31 is positioned as described below.

In the holder 31 of the display unit DU, when a lower end of the support frame 31a is inserted from the insertion port 41z and the entire support frame 31a advances into the barrel 41 together with the first display element 11a, the first display element 11a is accommodated in a space ISa, the base plate 31b is placed to be fitted into the recessed holder pedestal 41s, and a seat surface 41n and a lower surface 31j closely face each other. At this time, most of the insertion port 41z is closed by the base plate 31b, and thus dust and dirt are prevented from entering the holder 31.

The base plate 31b of the holder 31 has a thin portion 35t at left, right and rear edge portions. The thin portion 35t forms a step S2 facing the step S1 of the holder pedestal 41s. As a result, a groove TR is formed by the step S1 provided in the holder pedestal 41s of the barrel cover 41u and the step S2 provided in the thin portion 35t of the holder 31. The groove TR is a part of an adhesive application portion AA, and serves to hold the adhesive AM1 supplied between the holder 31 and the barrel 41 around the thin portion 35t of the base plate 31b.

A size of the base plate 31b of the holder 31 in plan view, that is, a size projected onto the XZ plane is smaller than a size of the holder pedestal 41s in plan view and is smaller than a size of the opening 52o formed in the first metallic frame 52a illustrated in FIG. 7 in plan view. Thus, even in a state in which the first metallic frame 52a is fixed to the barrel 41, the holder 31 can be placed on the upper portion 41t of the barrel 41 over the opening 52o of the first metallic frame 52a.

In order that a position of the support frame 31a of the holder 31 can be slightly moved in the X direction and the Z direction within the insertion port 41z, the outline of the insertion port 41z in plan view is made slightly larger than the outlines of the support frame 31a and the first display element 11a in plan view. As a result, the insertion port 41z is partially opened to form a gap G1 in the front upper portion of the holder 31, that is, on the front +Z side of a joint portion between the base plate 31b and the support frame 31a. That is, the insertion port 41z has a gap G1 between the insertion port 41z and the holder 31 on the rear surface side or the +Z side of the first display element 11a. The FPC portion 11f which is a wire 11r extending from the first display elements 11a, and the heat dissipation sheet 11s extend to the outside of the barrel 41 via the gap G1. Before the holder 31 is positioned and fixed with respect to the barrel 41, an adhesive AM2 serving as a sealing portion is applied to be filled between a front end of the insertion port 41z and the heat dissipation sheet 11s of the first display element 11a, the FPC portion 11f, and the like to cover the gap G1, and the adhesive AM2 is cured after the holder 31 is positioned as described below. The adhesive AM2 has a relatively high viscosity before being cured so that the shape thereof can be easily maintained. When the adhesive AM1 corresponding to the groove TR and the adhesive AM2 corresponding to the gap G1 are combined, a shape closed like four sides of a rectangle is obtained. A portion (the groove TR or the gap G1) to which the adhesives AM1 and AM2 serving as the seal member SM are applied becomes an adhesive application portion AA.

Figure 19:
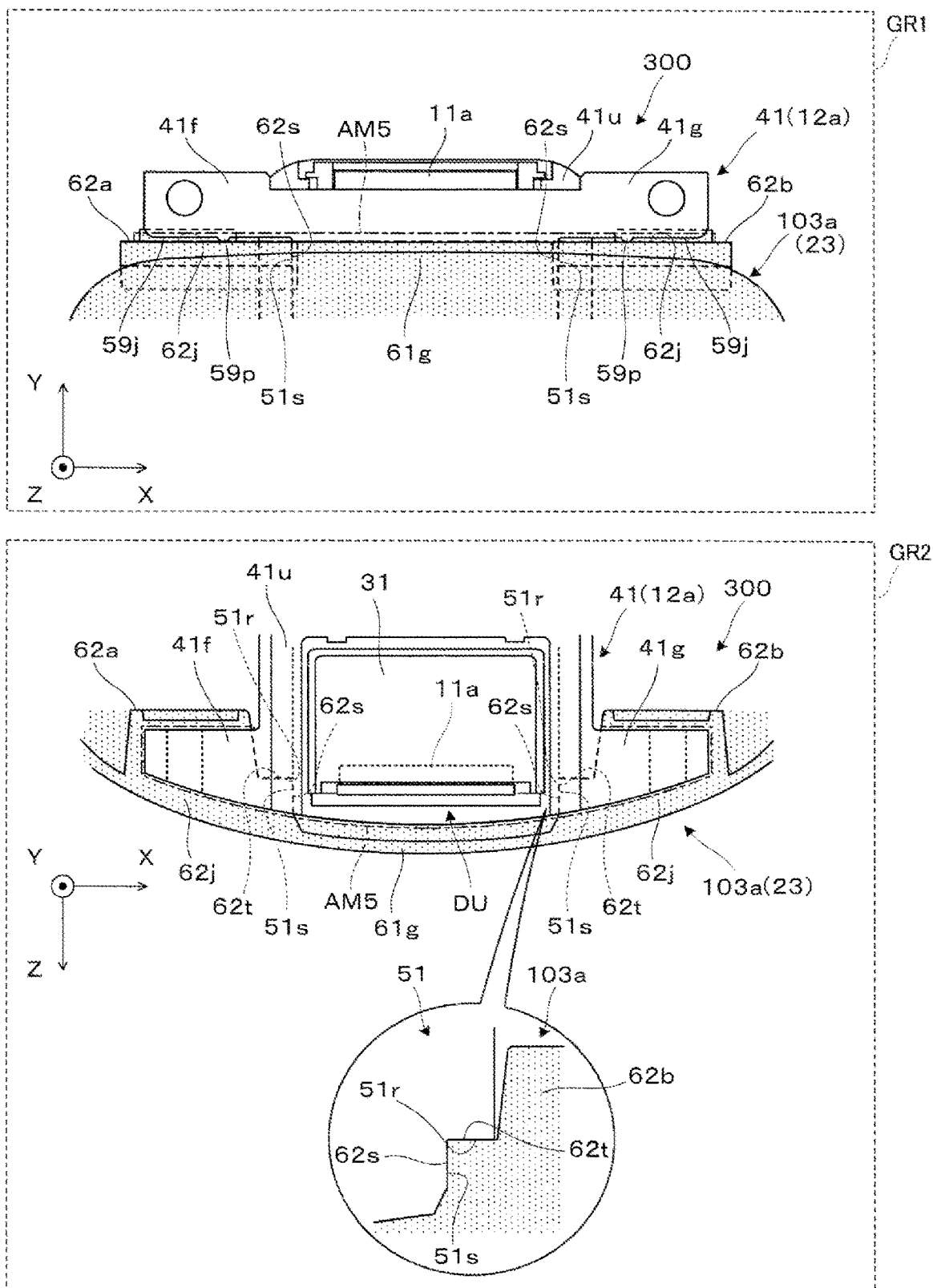
FIG. 19 is a front view and a plan view of an optical unit.

Fixing of the first combiner 103a to the barrel 41, that is, fixing of the see-through mirror 23 to the first projection optical system 12a will be described with reference to FIG. 19. In FIG. 19, a region GR1 is a front view of the barrel 41 and the first combiner 103a, and a region GR2 is a plan view of the barrel 41 and the first combiner 103a.

In the optical unit 300, a pair of protruding portions 41f and 41g are formed at the front side of the barrel 41 to protrude outward in the transverse direction. Further, a pair of mounting portions 62a and 62b are formed at an upper end 61g of the first combiner 103a to protrude inward, that is, to the −Z side. A pair of facing inner side surfaces 62s of the pair of mounting portions 62a and 62b are fitted to a pair of outward transverse side surfaces 51s of the barrel 41 to sandwich the pair of transverse side surfaces 51s, and positioning in the ±X direction is performed to reduce inclination. A pair of rear side surfaces 62t of the pair of mounting portions 62a and 62b are in contact with a pair of stepped front side surfaces 51r of the barrel 41, and positioning in the ±Z direction is performed to reduce inclination. Further, a plurality of convex portions 59p protruding from bottom surfaces 59j of the pair of protruding portions 41f and 41g are in contact with a pair of upper surfaces 62j of the pair of mounting portions 62a and 62b, and positioning in the ±Y direction is performed. After the above-described positioning, that is, after the positioning of six axes, an adhesive AM5 is supplied from the periphery between the bottom surfaces 59j of the protruding portions 41f and 41g and the upper surfaces 62j of the mounting portions 62a and 62b, the supplied adhesive AM5 is cured by ultraviolet rays or the like, and thus the fixing of the first combiner 103a to the barrel 41 is completed.

Figure 20:
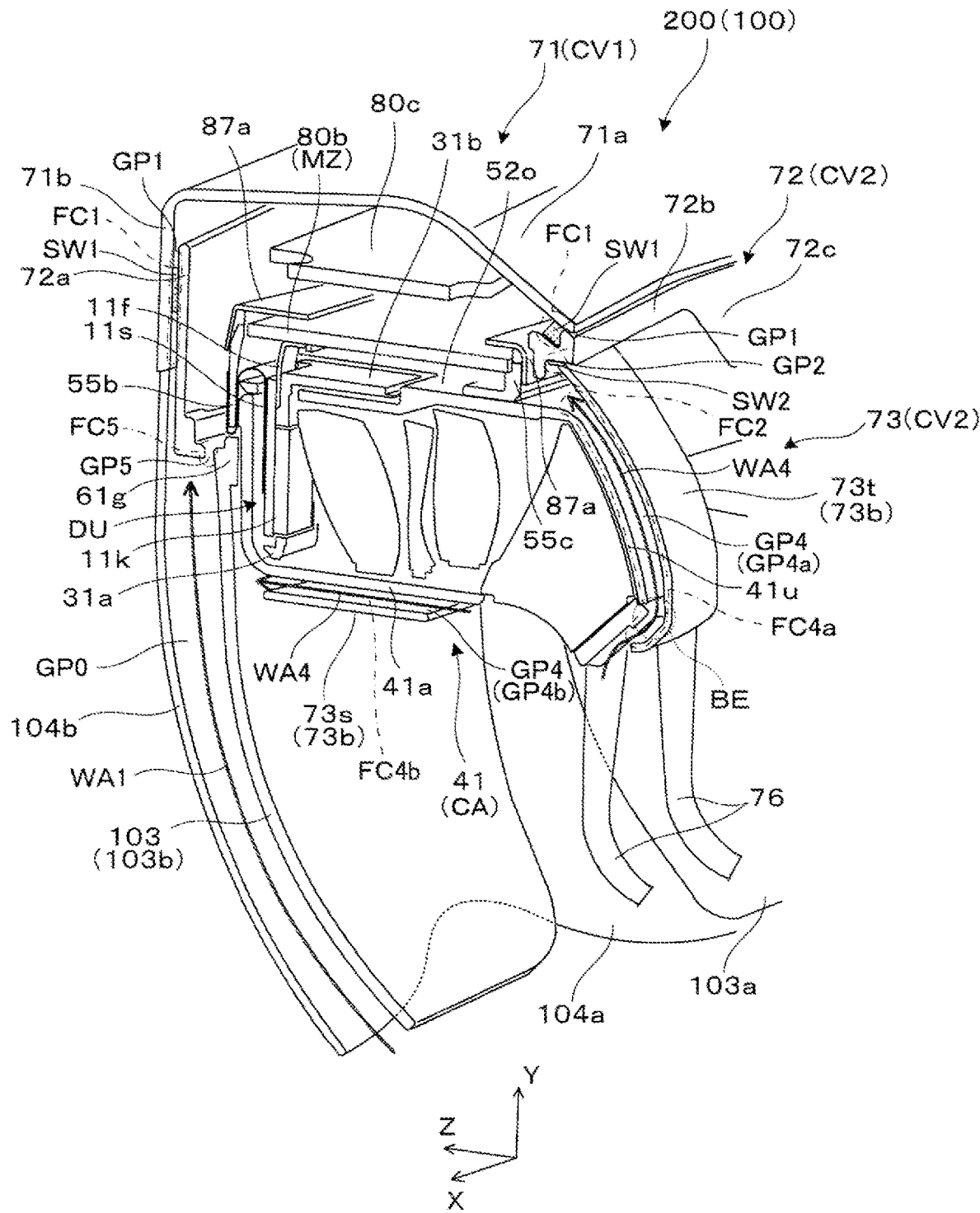
FIG. 20 is a side cross-sectional perspective view for describing an internal structure of the image display device.

Waterproofing or dustproofing in the image display device 200 will be described with reference to FIGS. 20 and 21. FIG. 20 is a cross-sectional view taken along line A-A of the HMD 200 or image display device 100 illustrated in FIG. 2, and FIG. 21 is a cross-sectional view taken along line B-B of the HMD 200 or image display device 100 illustrated in FIG. 2.

The image display device 200 includes a first seal member SW1 in a first facing portion FC1 between the upper case CV1 and the lower case CV2. Specifically, a gap GP1 is formed between the front plate 71b of the front cover 71 and the front plate 72a of the middle frame 72, and the gap GP1 is sealed by arranging the first seal member SW1 formed of, for example, an elastically deformable resin material to be sandwiched between a back surface of the front plate 71b and a front surface of the front plate 72a. The first seal member SW1 can be fixed to at least one of the back surface of the front plate 71b and the front surface of the front plate 72a with an adhesive. Similarly, although a gap GP1 is formed between the rear end of the top plate 71a of the front cover 71 and the rear frame 72b of the middle frame 72, the gap GP1 is sealed by arranging the first seal member SW1 to be sandwiched between a lower surface of the rear end of the top plate 71a and an upper surface of the rear frame 72b. The first seal member SW1 can be fixed to at least one of the lower surface of the rear end of the top plate 71a and the upper surface of the rear frame 72b with an adhesive. The first seal member SW1 is formed in a closed ring shape along the upper end of the middle frame 72, and achieves sealing over the entire circumference (refer to the first facing portion FC1 in FIG. 11). Thus, moisture WA1 entering between the combiner 103 and the shade 104 is prevented from passing through the first facing portion FC1.

The image display device 200 includes a second seal member SW2 in a second facing portion FC2 between the lower cover 73 and the middle frame 72. Specifically, a gap GP2 is formed between an upper end or the rear wall 73i of the rear protruding portion 73t of the lower cover 73 and the rear frame 72b or the rear plate 72c of the middle frame 72, and the gap GP2 is sealed by arranging the second seal member SW2 formed of, for example, an elastically deformable resin material to be sandwiched between the upper end or the rear wall 73i of the rear protruding portion 73t of the lower cover 73 and the rear frame 72b or the rear plate 72c of the middle frame 72. The second seal member SW2 can be fixed to at least one of the lower cover 73 and the middle frame 72 with an adhesive. The second seal member SW2 is formed along the rear frame 72b of the middle frame 72 and terminates at the end portion 72d (refer to the second facing portion FC2 in FIG. 11).

Figure 21:
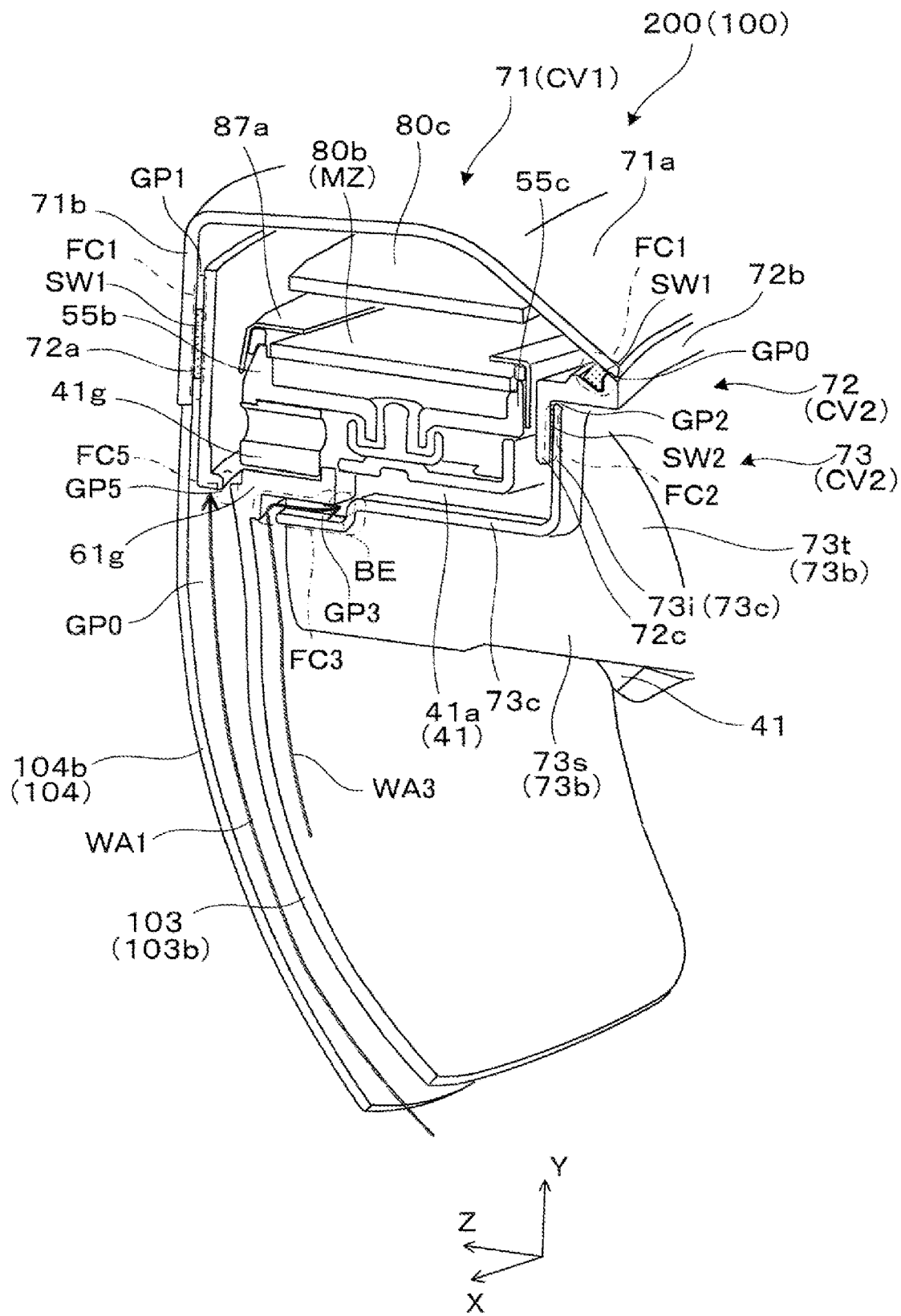
FIG. 21 is a side cross-sectional perspective view for describing the internal structure of the image display device.

As illustrated in FIG. 21, the image display device 200 has a gap GP3 as a partially bent or narrowed first gap between the combiner 103 and the lower case CV2. Specifically, the gap GP3 which is a first gap is generated in a third facing portion FC3 between the upper end 61g of the combiner 103 and the front end of the bottom wall 73h or the end portion 73c of the lower cover 73, and the gap GP3 serves as a flow path. However, since the gap GP3 which is the first gap has a curved portion BE which is bent and narrowed at the upper end, the moisture WA3 which enters between the combiner 103 and the shade 104 is curbed from passing through the gap GP3.

As illustrated in FIG. 20 and the like, the image display device 200 has a gap GP4 as a second gap which is partially bent or narrowed between the barrel 41 which is the optical case CA and the lower case CV2.

Specifically, a gap GP4a which is a second gap is generated in a fourth facing portion FC4a between the rear surface of the barrel 41 and the rear protruding portion 73t of the lower cover 73, and the gap GP4a serves as a flow path. However, the lower case CV2 is bent along the exterior of the optical case CA on the pupil position PP side (refer to FIG. 4). As a result, the gap GP4a has a curved portion BE bent along the exterior of the optical case CA on the lower end side. In order to accommodate the prism mirror 22, the optical case CA has a protrusion on the lower portion of the rear side which is the pupil position PP side. The gap GP4a which is the second gap is bent along the protrusion of the optical case CA. Due to the bent gap GP4a, the moisture WA4 which enters between the barrel 41 that is the optical case CA and the lower case CV2 is curbed from passing through the gap GP4a.

A gap GP4b which is a second gap is generated in a fourth facing portion FC4b between the lower surface of the barrel 41 and the downward protruding portion 73s of the lower cover 73, and the gap GP4b serves as a flow path. In the fourth facing portion FC4b, since the gap GP4b which is the second gap extends straight, the moisture WA4 that enters between the barrel 41 and the lower case CV2 passes through the gap GP4b but does not go around onto the barrel 41.

The image display device 200 has a gap GP5 as a third gap which is partially bent or narrowed between the combiner 103 and the lower case CV2. Specifically, the gap GP5 which is a third gap is formed in a fifth facing portion FC5 between the lower end of the front plate 72a of the middle frame 72 and the upper end 61g of the combiner 103. However, since the gap GP5 is narrower than a gap GP0 between the combiner 103 and the shade 104, the moisture WA1 that enters between the combiner 103 and the shade 104 is curbed from passing through the gap GP5.

In the above description, the gap GP3 which is the first gap, the gap GP4 which is the second gap, and the gap GP5 which is the third gap allow the rotation of the optical case CA and the combiner 103. In the present embodiment, the rotation of the optical device 101 is ensured from the viewpoint of improving visibility, and it is necessary to increase the gaps GP3, GP4, and GP5 to some extent. Even when the gaps GP3, GP4, and GP5 are provided, the gaps GP3, GP4a, and GP5 that are partially bent or narrowed make it difficult for water to enter the inside. Thus, in the image display device 100, it is possible to achieve both the waterproof structure and the improvement in visibility. Each of the gaps GP3, GP4a, and GP5 has a sufficient length in an entering direction to prevent moisture from entering the circuit board MZ. Clearance values of the gaps GP3, GP4a, and GP5 and widths in a direction orthogonal to a plane in which the gaps GP3, GP4a, and GP5 extend are, for example, 2 to 3 mm, and in particular, regarding the gaps GP3 and GP5, the clearance values are about 1 to 2 mm or less at a narrowing portion.

Figure 22:
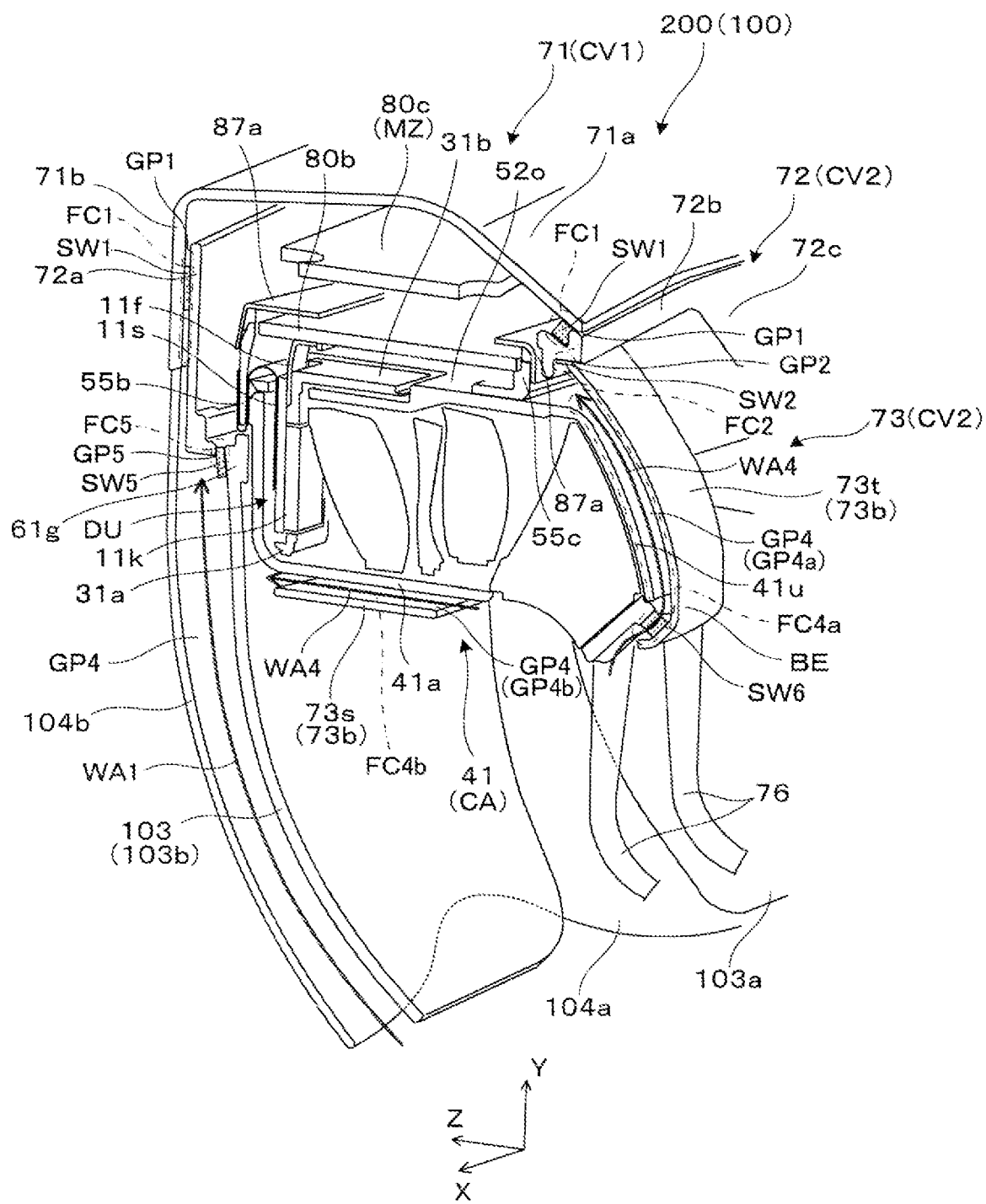
FIG. 22 is a side cross-sectional perspective view illustrating a cross-sectional structure of an image display device according to a modified example.

FIG. 22 is a cross-sectional perspective view illustrating an image display device 100 of the modified example. The image display device 200 includes a third seal member SW5 between the lower case CV2 and the combiner 103. Specifically, the gap GP5 is sealed by arranging the third seal member SW5 formed of an elastic body such as foamed urethane to be sandwiched between the lower end of the front plate 72a of the middle frame 72 and the upper end 61g of the second combiner 103b. The third seal member SW5 is fixed to one of the second combiner 103b and the middle frame 72 with an adhesive. In the third seal member SW5, a surface that is not fixed is smooth, and allows displacement or movement of the second combiner 103b or the middle frame 72 that faces the surface. Since the third seal member SW5 is largely elastically deformed, even when the clearance value of the gap GP5 is changed, the third seal member SW5 is deformed following the change. Although not illustrated, the third seal member SW5 is formed along the upper end 61g of the second combiner 103b and terminates at an end portion of the upper end 61g. The third seal member SW5 reliably prevents the moisture WA1 entering between the combiner 103 and the shade 104 from passing through the gap GP5, and prevents the moisture WA1 from going around onto the barrel 41 that is the optical case CA.

In this modified example, the image display device 200 includes a fourth seal member SW6 between the barrel 41 which is the optical case CA and the lower case CV2. Specifically, the gap GP4a is sealed by arranging the fourth seal member SW6 formed of an elastic body to be sandwiched between a protrusion formed at a rear lower portion of the barrel 41 and a lower end portion of the rear protruding portion 73t of the lower cover 73. The fourth seal member SW6 is fixed to one of the barrel 41 and the lower cover 73 with an adhesive. In the fourth seal member SW6, a surface that is not fixed is smooth, and allows displacement or movement of the barrel 41 or lower cover 73 that faces the surface. Since the fourth seal member SW6 is largely elastically deformed, even when the clearance value of the gap GP4a is changed, the fourth seal member SW6 is deformed following the change. Although not illustrated, the fourth seal member SW6 is formed along the rear protruding portion 73t of the lower cover 73 and extends to the left and right end portions of the rear protruding portion 73t.

The image display device 100 of the modified example illustrated in FIG. 22 may be a fixed type in which the optical device 101 is not rotated. When the optical device 101 is not rotated, the bearing member 59a illustrated in FIG. 5 is not required, and the gaps GP4 and GP5 can be narrowed or the gaps GP4 and GP5 can be eliminated. Since the clearance value does not change even when the gaps GP4 and GP5 remain, the elastic deformation of the third seal member SW5 and the fourth seal member SW6 is not essential.

The image display device 100 according to the embodiment described above includes the display elements 11a and 11b, the optical members 2a and 2b for imaging, the circuit members 80a and 80b serving as the circuit board MZ, the optical case CA accommodating the display elements 11a and 11b and the optical members 2a and 2b, the metallic frames 52a and 52b supporting the circuit members 80a and 80b serving as the circuit board MZ from below, and the exterior case 7 accommodating the optical case CA and the metallic frames 52a and 52b, wherein the metallic frames 52a and 52b are disposed above the optical case CA, and the exterior case 7 includes the upper case CV1 and the lower case CV2 and includes the first seal member SW1 at the first facing portion FC1 between the upper case CV1 and the lower case CV2.

In the image display device 100, since the first seal member SW1 is provided in the first facing portion FC1 between the upper case CV1 and the lower case CV2, the gap between the upper case CV1 and the lower case CV2 can be closed in the exterior case 7. In the exterior case 7, since the circuit board MZ is disposed above the optical case CA, the circuit board MZ is not disposed in the vicinity of a water intrusion path. Even when water enters from between the exterior case 7 and the optical case CA, it is possible to prevent water from entering the circuit board MZ disposed on the inner side of the exterior case 7.

Modified Examples and Others

Although the present disclosure has been described with reference to the above embodiments, the present disclosure is not limited to the above embodiments and can be implemented in various modes without departing from the spirit of the disclosure. For example, the following modifications are possible.

Although the HMD 200 includes the first display device 100A and the second display device 100B in the above description, the HMD 200 or the image display device 100 may be configured so that a single first display device 100A or second display device 100B is supported in front of the eyes by the support device 100C.

The first metallic frame 52a and the second metallic frame 52b are not limited to a magnesium alloy, and can be formed of an aluminum alloy or other metals. Specifically, the first metallic frame 52a and the second metallic frame 52b may be formed of an alloy including one or more of manganese, aluminum, and titanium. The joint 50c may also be formed of an alloy including one or more of manganese, aluminum, and titanium.

The lower case CV2 does not need to be divided into the middle frame 72 and the lower cover 73, and they can be formed as one component.

The shape and length of the gap GP3 which is the first gap and the gap GP4 which is the second gap can be appropriately changed according to the use of the HMD 200 or the like.

Components such as the camera 3a, the illuminance sensor 3b, the proximity sensor 3c, and the speaker can be omitted as appropriate according to the application. A waterproof structure may be provided around the speaker.

Although the case in which the first display unit 20a is screwed to the first metallic frame 52a has been described above, the first display unit 20a or the barrel 41 can be fixed to the first metallic frame 52a not only by screwing but also by caulking, bonding, or the like. In this case, the number of fixing locations is not limited to four, and various fixing locations can be provided, and linear or planar fixing extending continuously is also possible.

The first projection optical system 12a and the first combiner 103a can be coupled and fixed to the first metallic frame 52a to be suspended therefrom. In this case, it is not necessary to fix the first combiner 103a to the first projection optical system 12a or the barrel 41. As a method of suspending the first combiner 103a from the first metallic frame 52a, a method similar to the method used when the first projection optical system 12a or the barrel 41 is suspended from the first metallic frame 52a can be used.

In the description above, although it was assumed that the image display device 100 was worn on the head and was used, the image display device 100 may also be used as a hand-held display that is not worn on the head and is to be looked into like binoculars. In other words, the head-mounted display also includes a hand-held display in the present disclosure.

An image display device according to a specific aspect includes a display element, an optical member for imaging, a circuit board, an optical case accommodating the display element and the optical member, a metallic frame supporting the circuit board from below, and an exterior case accommodating the optical case and the metallic frame, wherein the metallic frame is disposed on the upper side of the optical case, and the outer case has an upper case and a lower case, and has a first seal member at a first facing portion between the upper case and the lower case.

In the image display device, since the first seal member is provided in the first facing portion between the upper case and the lower case, the gap between the upper case and the lower case can be closed in the exterior case. The circuit board is not disposed in the vicinity of the water intrusion path by arranging the circuit board above the optical case in the exterior case. Even when water enters between the exterior case and the optical case, it is possible to prevent water from entering the circuit board disposed on the inner side of the exterior case.

In an image display device according to a specific aspect, a lower case includes a middle frame and a lower cover, the middle frame is disposed between an upper case and a lower cover, an exterior case includes a first seal member at a first facing portion between the upper case and the middle frame, and the exterior case includes a second seal member at a second facing portion between the lower cover and the middle frame. Since the lower case is divided into two members and providing the first and second seal members in the first and second facing portions, it is possible to correspond to the shape of the optical case or the like while the sealing property of the exterior case is maintained.

In an image display device according to a specific aspect, the optical case is sealed. In this case, the waterproofing of the image display device can be improved.

In an image display device according to a specific aspect, a metallic frame is supported by a bearing member to be rotatable with respect to an exterior case, and a lower case includes a support portion that supports the bearing member. In this case, visibility can be improved by allowing the rotation of the optical case with respect to the exterior case.

An image display device according to a specific aspect includes a combiner supported by a metallic frame via an optical case, a first gap that is partially bent or narrowed is provided between the combiner and the optical case, and a second gap that is partially bent or narrowed is provided between the optical case and the lower case. It is possible to sufficiently allow the rotation of the combiner by having the first and second gaps. Even when a gap is provided to improve visibility, the first and second gaps that are partially bent or narrowed make it difficult for water to enter. Thus, it is possible to achieve both a waterproof structure and an improvement in visibility in the image display device.

In an image display device according to a specific aspect, the first gap has a curved portion narrowed at the upper end, and the second gap has a curved portion along the exterior of the optical case on the pupil position side of the lower case.

An image display device according to a specific aspect includes a combiner supported by a metallic frame via an optical case, and a shade disposed outside the combiner and supported by an upper case, and further includes a third seal member between the combiner and any of the shade, the upper case, and the lower case. In this case, the waterproof property between the combiner and the lower case can be further enhanced.

An image display device according to a specific aspect includes a shield member that covers a circuit board from above. In this case, the circuit board is sandwiched between the shield member and the metallic frame, and the waterproof property of the circuit board can be enhanced while electromagnetic interference is prevented by the shield member.

In an image display device according to a specific aspect, the lower cover is formed of a metal.

An image display device according to a specific aspect includes a first optical case for a right eye corresponding to an optical case, a second optical case for a left eye having the same structure as the first optical case, a first metallic frame corresponding to the metallic frame, a second metallic frame supporting the second optical case, and a joint coupling the first metallic frame and the second metallic frame, wherein the joint is covered at an upper side thereof with a shield member and at a lower side thereof with a peripheral seal member. In this case, the joint and periphery thereof can be waterproofed.

In an image display device according to a specific aspect includes a first optical case for the right eye corresponding to an optical case and a second optical case for the left eye having the same structure as the first optical case, wherein the metallic frame is an integrated member that supports the first optical case and the second optical case. In this case, the shape of the metallic frame can be simplified, and waterproofing of the metallic frame and the periphery thereof is simplified.

What is claimed is:

1. An image display device comprising:
   a display element;
   an optical member for imaging;
   a circuit board;
   an optical case configured to accommodate the display element and the optical member;
   a metallic frame configured to support the circuit board from below; and
   an exterior case configured to accommodate the optical case and the metallic frame, wherein
   the metallic frame is disposed above the optical case,
   the exterior case includes an upper case and a lower case, and includes a first seal member at a first facing portion between the upper case and the lower case,
   the lower case includes a middle frame and a lower cover,
   the middle frame is disposed between the upper case and the lower cover, and
   the circuit board is disposed between the middle frame and the lower cover, wherein
   the exterior case includes the first seal member at the first facing portion between the upper case and the middle frame, and
   the exterior case includes a second seal member at a second facing portion between the lower cover and the middle frame.

2. The image display device according to claim 1, wherein the optical case is sealed.

3. The image display device according to claim 2, wherein
   the metallic frame is supported by a bearing member to be rotatable with respect to the exterior case, and
   the lower case includes a support portion that supports the bearing member.

4. The image display device according to claim 1, further comprising:
   a combiner supported by the metallic frame via the optical case;
   a first gap that is partially bent or narrowed between the combiner and the lower case; and
   a second gap that is partially bent or narrowed between the optical case and the lower case.

5. The image display device according to claim 4, wherein
   the first gap has a curved portion that is narrowed at an upper end thereof, and
   the second gap has a curved portion along an exterior of the optical case on a pupil position side of the lower case.

6. The image display device according to claim 1, further comprising
   a combiner supported by the metallic frame via the optical case;
   a shade disposed outside the combiner and supported by the upper case; and
   a third seal member between the combiner and any of the shade, the upper case, and the lower case.

7. The image display device according to claim 1, further comprising a shield member configured to cover the circuit board from above.

8. The image display device according to claim 1, wherein the lower cover is formed of a metal.

9. The image display device according to claim 1, further comprising:
   a first optical case for a right eye corresponding to the optical case;
   a second optical case for a left eye having the same structure as the first optical case;

a first metallic frame corresponding to the metallic frame;
a second metallic frame configured to support the second optical case, and a joint configured to couple the first metallic frame and the second metallic frame, wherein
an upper side of the joint is covered with a shield member and a lower side thereof is covered with a peripheral seal member.

10. The image display device according to claim 1, further comprising:
a first optical case for a right eye corresponding to the optical case; and
a second optical case for a left eye having the same structure as the first optical case, wherein
the metallic frame is an integrated member that supports the first optical case and the second optical case.

* * * * *